(12) United States Patent
Karkosch et al.

(10) Patent No.: US 7,089,978 B2
(45) Date of Patent: Aug. 15, 2006

(54) TOOL ATTACHMENT SYSTEM AND ROUTER ATTACHMENT AND METHOD INCORPORATING SAME

(75) Inventors: Joe Karkosch, Palatine, IL (US); John R. Kochanski, Palatine, IL (US); Edward Adkins, Rockford, IL (US); Patrick J. Barkdoll, Pecatonica, IL (US)

(73) Assignee: Nomis LLC, Rockford, IL (US)

( * ) Notice: Subject to any disclaimer, the term of this patent is extended or adjusted under 35 U.S.C. 154(b) by 0 days.

(21) Appl. No.: 10/777,016

(22) Filed: Feb. 11, 2004

(65) Prior Publication Data

US 2004/0182476 A1 Sep. 23, 2004

Related U.S. Application Data

(60) Provisional application No. 60/446,871, filed on Feb. 12, 2003, provisional application No. 60/505,275, filed on Sep. 23, 2003, provisional application No. 60/530,701, filed on Dec. 15, 2003.

(51) Int. Cl.
*B27C 9/02* (2006.01)
*B27C 5/10* (2006.01)

(52) U.S. Cl. ............ 144/136.95; 144/371; 409/182; 409/229

(58) Field of Classification Search .......... 144/136.95, 144/286.1, 286.5, 287, 371; 409/182, 229
See application file for complete search history.

(56) References Cited

U.S. PATENT DOCUMENTS

| 4,044,805 | A | * | 8/1977 | Gronholz | 144/154.5 |
| 4,291,735 | A | | 9/1981 | Silken | |
| 4,718,468 | A | * | 1/1988 | Cowman | 144/154.5 |
| 5,117,879 | A | * | 6/1992 | Payne | 144/48.6 |
| 5,289,861 | A | * | 3/1994 | Hedrick | 144/135.2 |
| 5,308,201 | A | | 5/1994 | Wilson et al. | |
| 5,398,740 | A | * | 3/1995 | Miller | 144/286.1 |

(Continued)

FOREIGN PATENT DOCUMENTS

EP 0 469 344 2/1992

(Continued)

OTHER PUBLICATIONS

Festool, *So schnell gibt's keine Bessere*, Oberrase OF 1400—setzt neue Maßstäbe in ihrer-Klasse, Werkzeuge für höchste Ansprüche, TTS Systems AG & Co., Wendlingen, DE, Feb. 2004, 4 pages for a brochure.

(Continued)

*Primary Examiner*—Derris H. Banks
*Assistant Examiner*—Shelley Self
(74) *Attorney, Agent, or Firm*—Reinhart Boerner Van Deuren P.C.

(57) ABSTRACT

The present invention is directed toward a quick attach and detach mechanism for a tool attachment such as a router attachment for a router. The attachment system includes a mounting adapter which may be integrally formed with the router housing or attached to the router housing as a bolt-on plate. The system works by vertically installing the tool attachment with the mounting adapter and then twisting to secure the tool attachment to the mounting adapter. A rotational lock is provided to prevent the tool attachment from inadvertently backing off or coming loose. This lock can be manually actuated to allow for quick detachment when desired. The tool attachment system is shown in association with a router which has several disclosed benefits, however there may also be applications of the system in other types of tool attachments for which coverage is also sought.

45 Claims, 24 Drawing Sheets

U.S. PATENT DOCUMENTS

| | | | | |
|---|---|---|---|---|
| 5,983,968 | A | * | 11/1999 | Newman .................... 144/372 |
| 6,305,447 | B1 | * | 10/2001 | Rousseau ................. 144/135.2 |
| 6,520,227 | B1 | * | 2/2003 | Mc Farlin et al. .......... 144/371 |
| 2003/0113180 | A1 | | 6/2003 | Schelberg et al. |

FOREIGN PATENT DOCUMENTS

| | | |
|---|---|---|
| EP | 0 469 538 | 2/1992 |
| EP | 0 545 142 | 6/1993 |
| EP | 0 546 376 | 2/1997 |
| WO | WO 90/03248 | 4/1990 |

OTHER PUBLICATIONS

Trend Routing Technology, *2002 Routing Cataloque*, 5 pages of a catalogue.

*Bosch Industrial Shop Router*, Model 0601617739, Robert Bosch Tool Corporation, Jul. 1998, 2 pages.

*Bosch Consumer Information Manual*, Robert Bosch Tool Corporation, May 20, 2003, 68 pages.

* cited by examiner

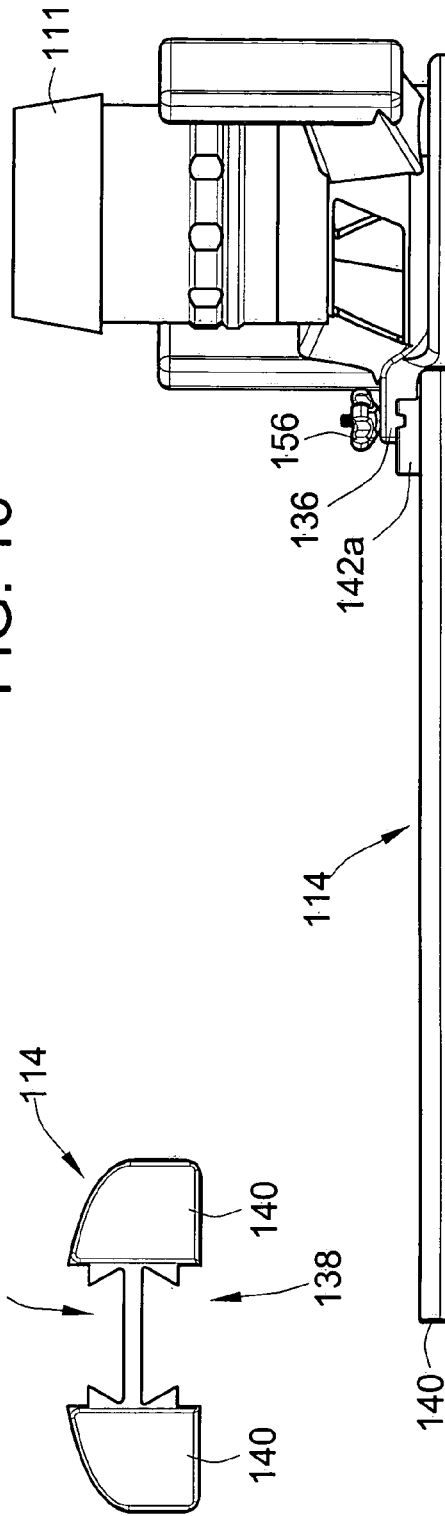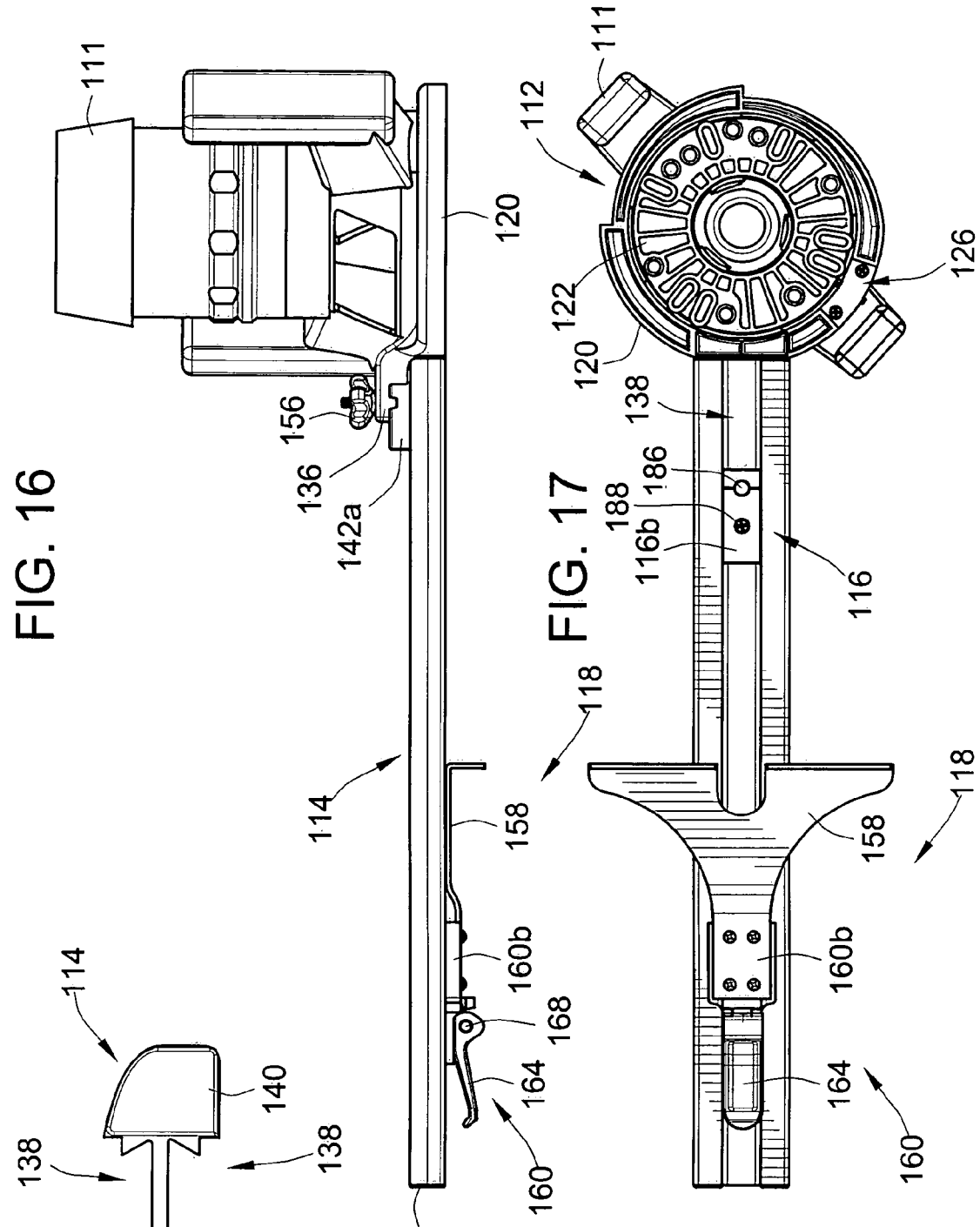

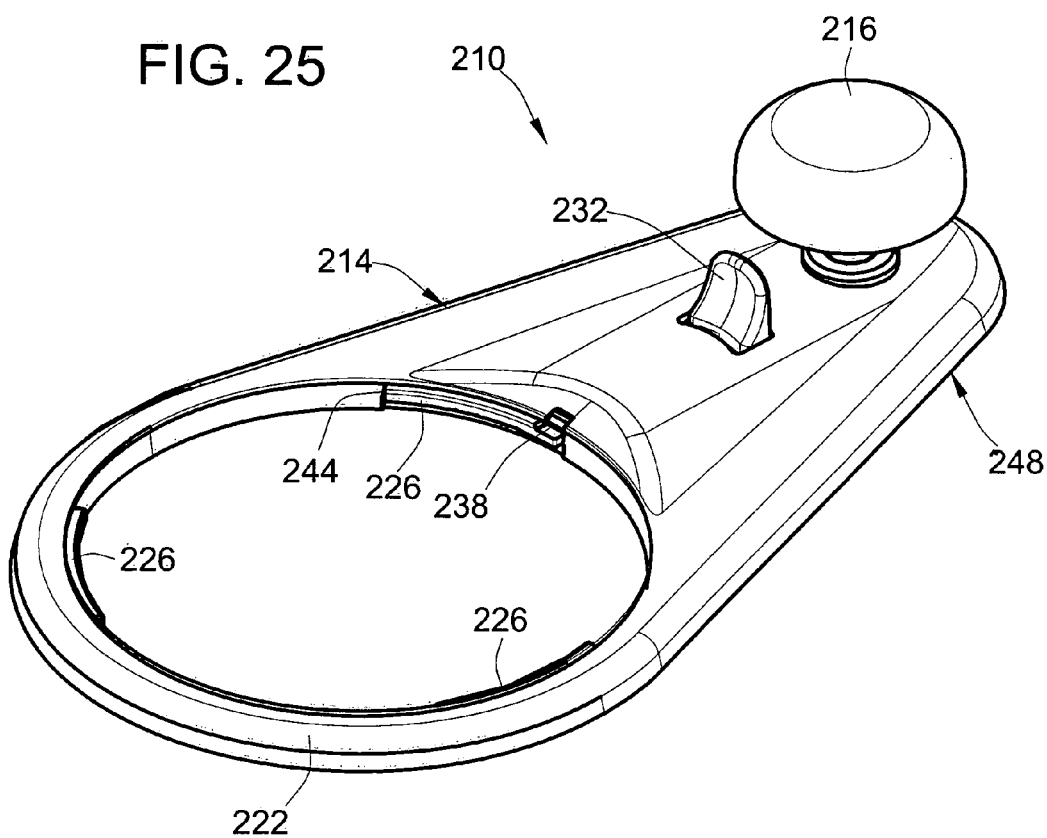
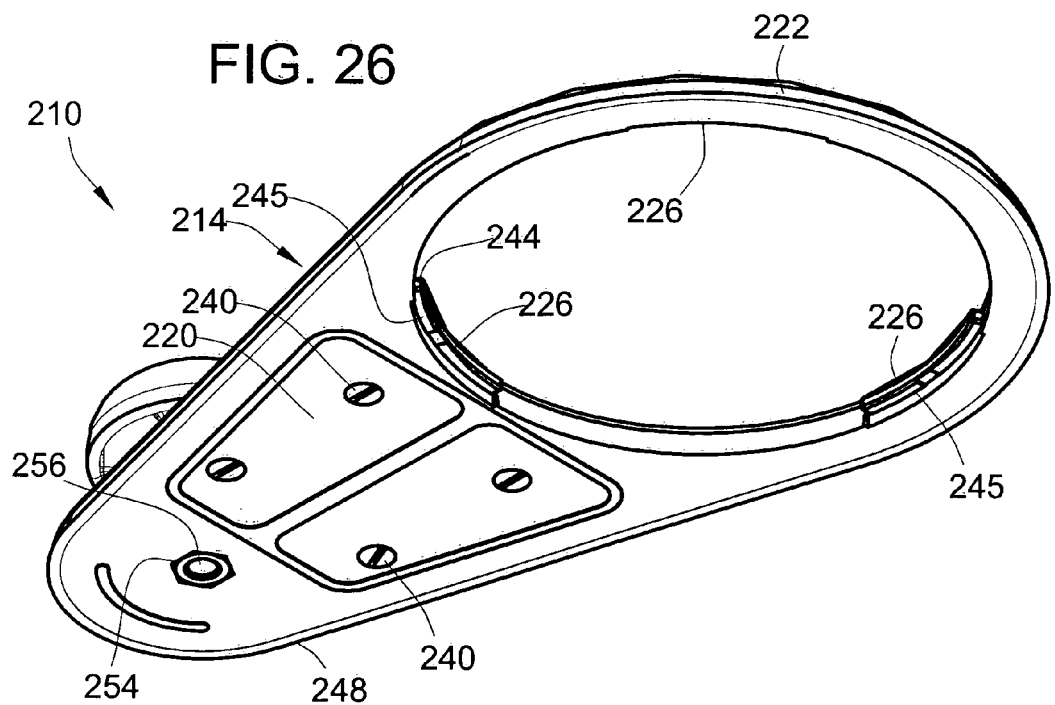

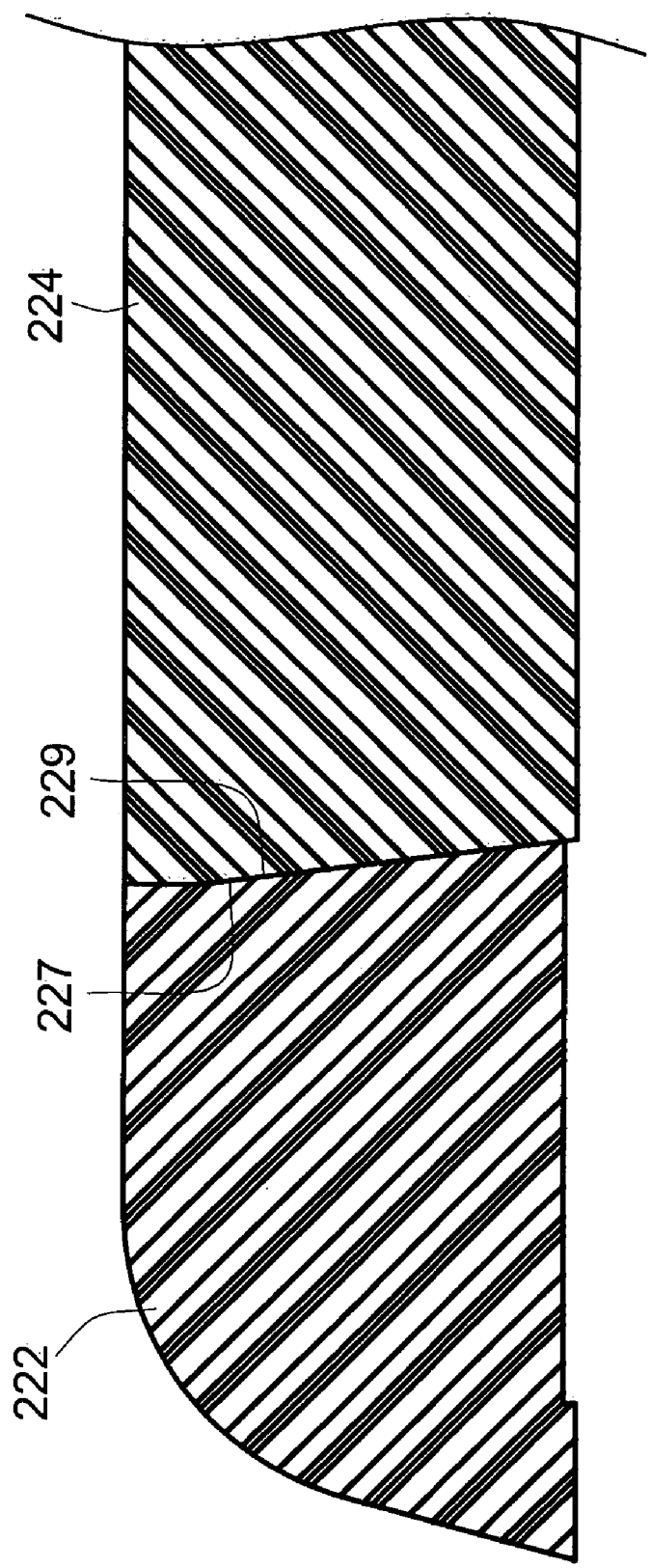

TOOL ATTACHMENT SYSTEM AND ROUTER ATTACHMENT AND METHOD INCORPORATING SAME

CROSS-REFERENCE TO RELATED PATENT APPLICATIONS

This patent application claims the benefit of U.S. Provisional Patent Application Nos. 60/446,871, filed Feb. 12, 2003, 60/505,275, filed Sep. 23, 2003, and 60/530,701, filed Dec. 15, 2003.

FIELD OF THE INVENTION

The present invention relates generally to tools and more particularly to tool attachment systems and methods for attaching and detaching tool attachments.

BACKGROUND OF THE INVENTION

A router is a well known rotary cutting tool for routing a workpiece. Typically a router has a rotating bit which extends through a router base. At times it is desired to utilize a tool attachment such as a guide bushing, having a cylindrical extension, spaced around the bit, to guide the router along a template wall. The diameter of the cylindrical extension determines the distance between the bit and the template wall, which determines the resultant pattern.

Typically a guide bushing is attached to a router base by first attaching an adapter plate to the router base, and then attaching the desired guide bushing to the adapter plate, typically by fastening the bushing to the adapter plate. However, because adapter plates for particular router models and manufacturers typically have their own unique bolt patterns, retailers must stock many models of adapter plates and guide bushings.

The present invention is directed toward improvements over the prior art, which are particularly applicable to routers, and that may also have application to other forms of tool attachments.

BRIEF SUMMARY OF THE INVENTION

The present invention has several aspects which are herein sought to be protected. In general, the present invention is directed toward a tool attachment and system and method for providing for quick attachment and detachment of such tool attachments, while also reliably securing and locating the tool attachment.

According to one aspect of the invention, a tool attachment is provided for mounting to a mounting adapter along a tool axis in which the mounting adapter includes an annular mounting surface and a plurality of mounting flanges angularly spaced about the axis. The tool attachment comprises an attachment housing having a generally circular attachment surface that is sized and configured to mate with the annular mounting surface of the mounting adapter. A plurality of attachment flanges project radially from the attachment housing along the attachment surface. These attachment flanges are arranged in a common plane generally perpendicular to the axis and are angularly spaced about the axis. The spacing between attachment flanges forms a plurality of gaps between adjacent pairs of the attachment flanges which provide sufficient clearance to receive the mounting flanges of the mounting adapter through these gaps.

Another aspect of this invention is directed toward a new method of releasably attaching a tool attachment to a mounting adapter about an axis. The method is directed toward a mounting adapter with an annular mounting surface and a tool attachment with an annular attachment surface. According to the method, the tool attachment is installed onto the mounting adapter along the axis to facilitate engagement between the first and second attachment service in a first direction along the axis. Relative rotation between the mounting adapter and the tool attachment is conducted to cause interlocking engagement between corresponding end flanges along the first and second attachment surfaces. This provides for retention of the tool attachment to the mounting adapter in a second opposite axial direction. Thereafter, the mounting adapter and the tool attachment are rotationally locked.

The present invention is thought to have particular application and advantages in router applications and therefore certain claims are directed toward such router attachment systems. According to this aspect, a mounting adapter is provided along an end face of a router housing in which the mounting adapter includes an annular mounting surface. A router attachment is provided that has an attachment housing with an annular attachment surface that mates with the annular mounting surface. The router attachment is rotatable between a release position and an attached position. The router attachment is removable from the mounting adapter in the release position and vertically engages the mounting adapter in opposing axial directions in the attached position. A lock is provided which locks the router attachment to the mounting adapter in the attached position to prevent relative rotation between the two components. The lock is subject to manual actuation to allow rotation between the router attachment and the mounting adapter to allow for detachment of the router attachment from the mounting adapter.

A further aspect of the invention is directed toward the router attachment system for a router comprises a mounting adapter plate that has a plurality of bolt holes and a central hole adapted for communicating the spindle of the rotor therethrough when the mounting adapter plate is mounted to the rotor housing. The bolt holes facilitate mounting of the mounting adapter to the router housing via a fastening operation. A router attachment is provided that is adapted to position the router. The router attachment attaches and detaches from the mounting adapter plate without bolts or fasteners. The rotor attachment is vertically and rotationally secured to the mounting adapter plate through engagement when attached to the mounting plate to prevent movement therebetween.

Other features and advantages of the invention will be apparent from the following specification taken in conjunction with the following drawings.

BRIEF DESCRIPTION OF THE DRAWINGS

FIG. 16 is a side profile view of the adjustable router guide attachment shown in FIG. 14, with a router attached thereto.

FIG. 17 is a bottom view the adjustable router guide attachment shown in FIG. 14, with a router attached thereto.

FIG. 18 is an end view of the rail used is the adjustable router guide attachment shown in FIG. 14.

FIG. 25 is an isometric top side view of an adjustable router guide attachment in accordance with an embodiment of the present invention.

FIG. 26 is an isometric bottom side view of the adjustable router guide attachment shown in FIG. 25.

FIG. 35 is an enlarged cross-section of the mounting plate and collar portion to better illustrate vertical retention of the mounting plate to the attachment housing.

DETAILED DESCRIPTION OF THE INVENTION

Figure 1:
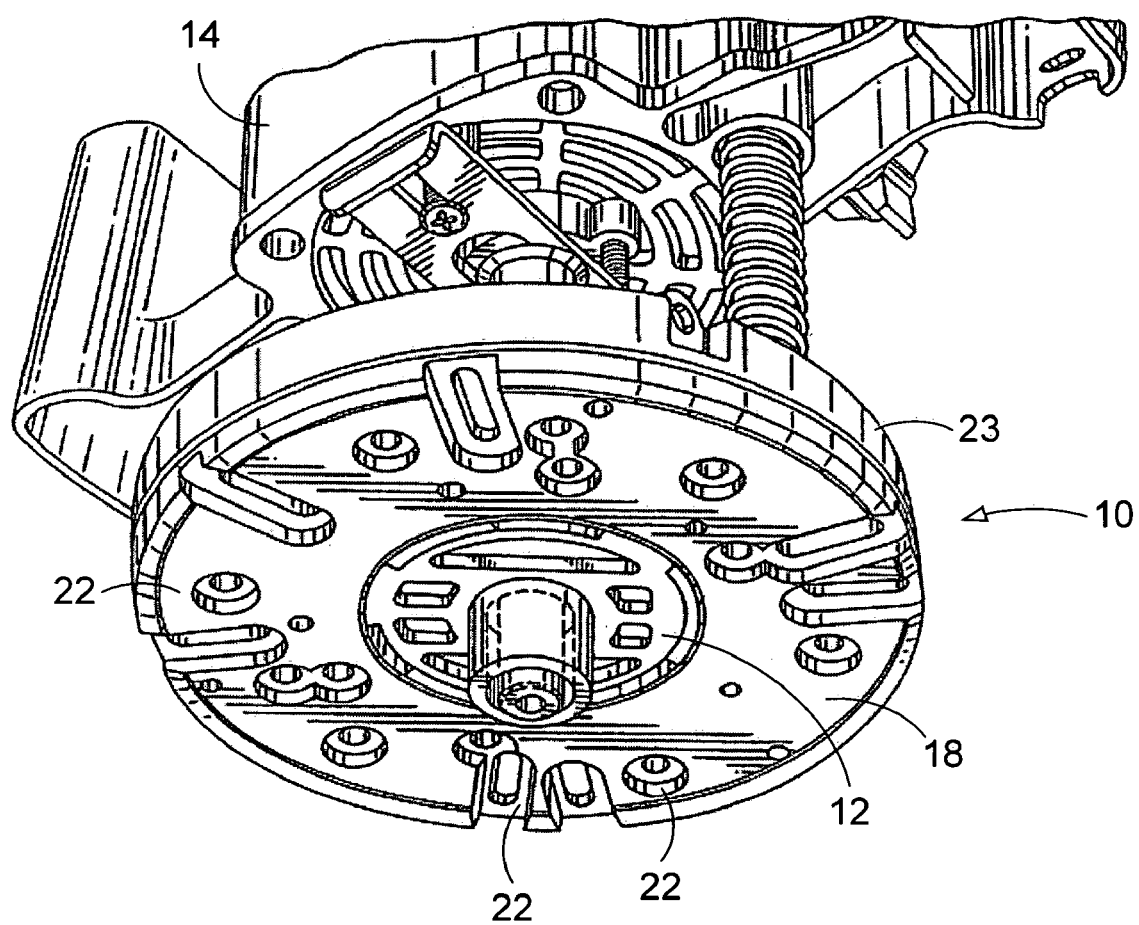
FIG. 1 is a perspective view of a universal router guide bushing of the present invention, attached to a router.
Figure 2:
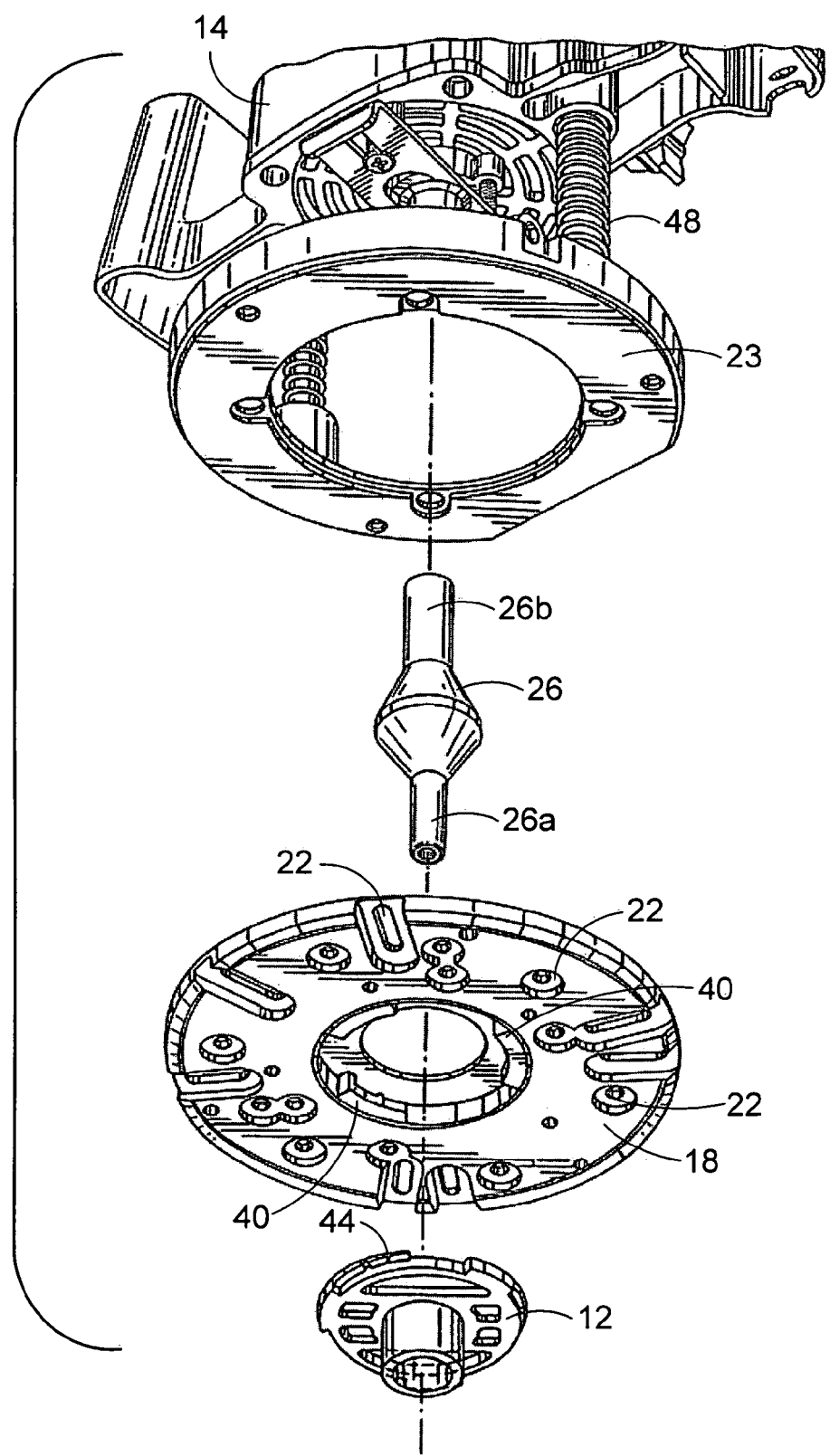
FIG. 2 is an exploded view of FIG. 1.

While this invention is susceptible of embodiment in many different forms, there is shown in the drawings and will herein be described in detail various embodiments of the invention with the understanding that the present disclosure is to be considered as an exemplification of the principles of the invention and is not intended to limit the broad aspect of the invention to the embodiment illustrated.

A universal router bushing adapter, generally designated 10, for permitting attachment of a router guide bushing 12 to any of a plurality of routers, such as router 14, is illustrated in the FIGS. 1–13. The router guide bushing has a cylindrical extension 13. The adapter 10 comprises an adapter plate 18 having a plurality of mounting apertures 22 corresponding to mounting apertures of the plurality of spring-biased router base plates, such as base plate 23.

The adapter 10 further includes a centering bit 26 having a first end 26a dimensioned for insertion into a router chuck 28. The router chuck 28 is dimensioned to receive a bit of a first dimension, such as ¼inch. The centering bit 26 further includes a first centering portion spaced from the first end 26a. The first centering portion is in the form of a frustum. The first centering portion is generally solid.

For use with a router having a chuck dimensioned to receive a bit of a second dimension, such as ½inch, the centering bit 26 also includes a second end 26 be dimensioned for insertion into the second dimensioned chuck. The centering bit also includes a second centering portion spaced from the second end 26b. The second centering portion is in the form of a frustum.

The adapter plate 18 includes a central aperture surface 18a defining a central aperture 38. The adapter plate 18 further includes three lips 40 disposed along the central aperture surface 18a to engage three respective cooperative tapered lips 44 on the guide bushing 12. Each of the tapered lips 40 includes a protrusion 40a (FIG. 12) to engage a cooperative recess 44a (FIG. 9) on a respective one of the guide bushing tapered lips 44. This provides a form of rotational lock that can be manually locked and unlocked.

Figure 3:
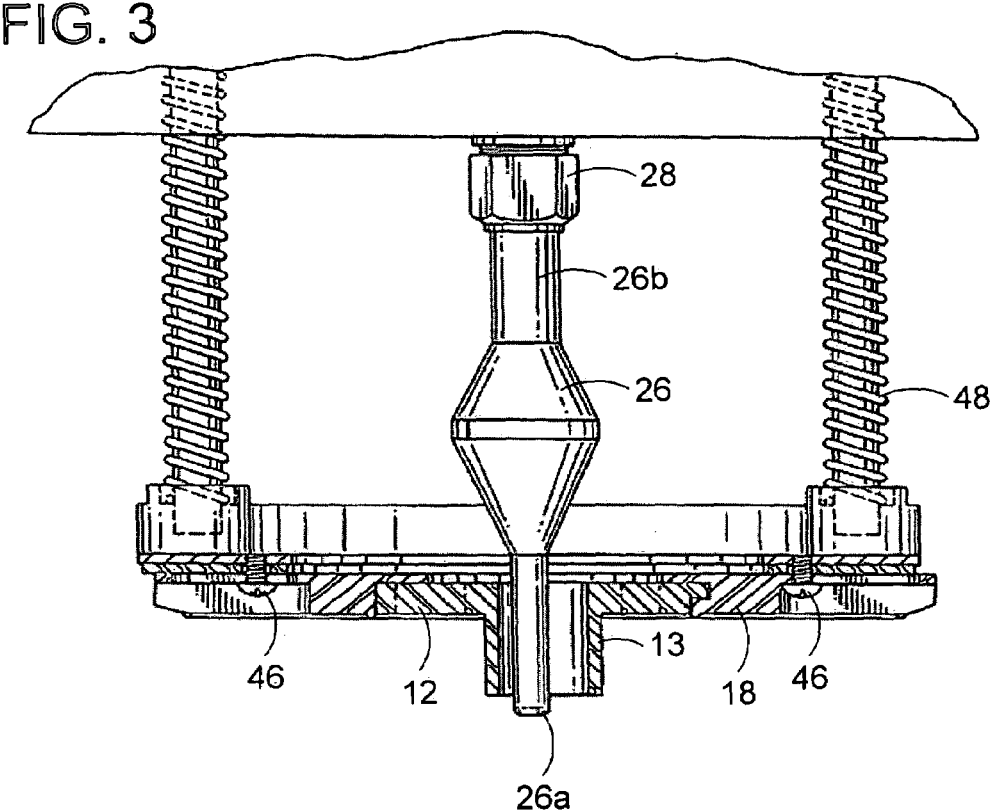
FIG. 3 illustrates a first step in aligning the universal router guide bushing of FIG. 1, with a chuck of a first dimension.
Figure 4:
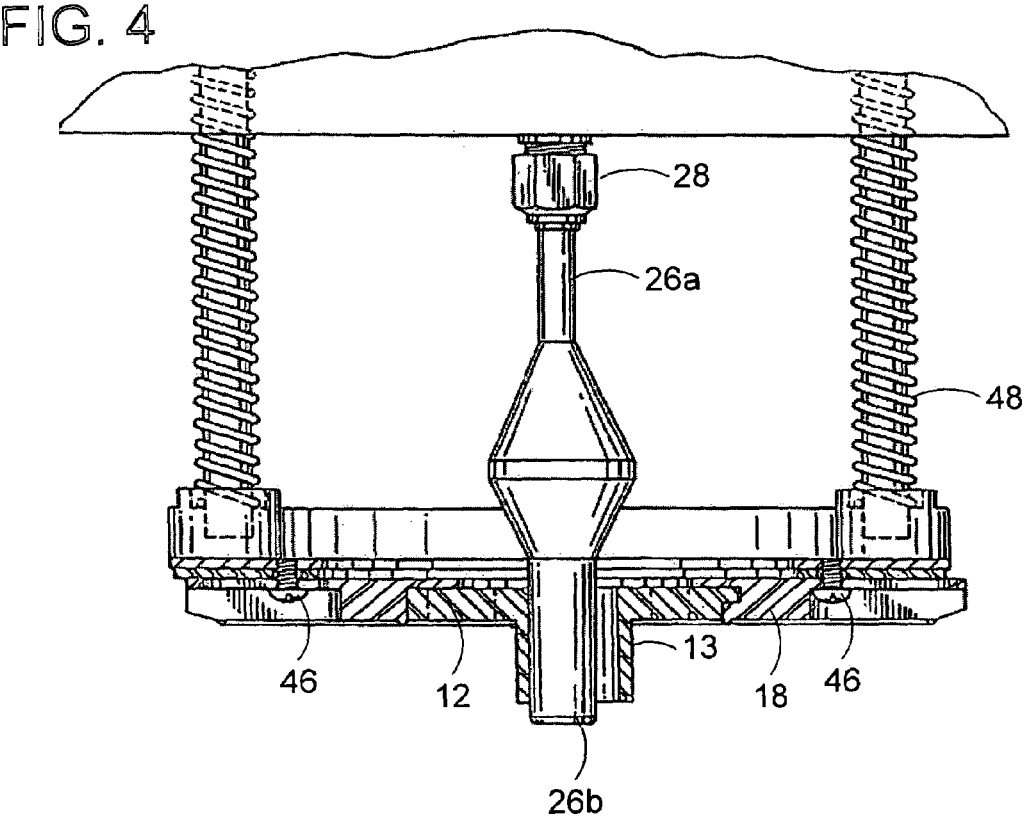
FIG. 4 illustrates a first step in aligning the universal router guide bushing of FIG. 1, with a chuck of a second dimension.
Figure 5:
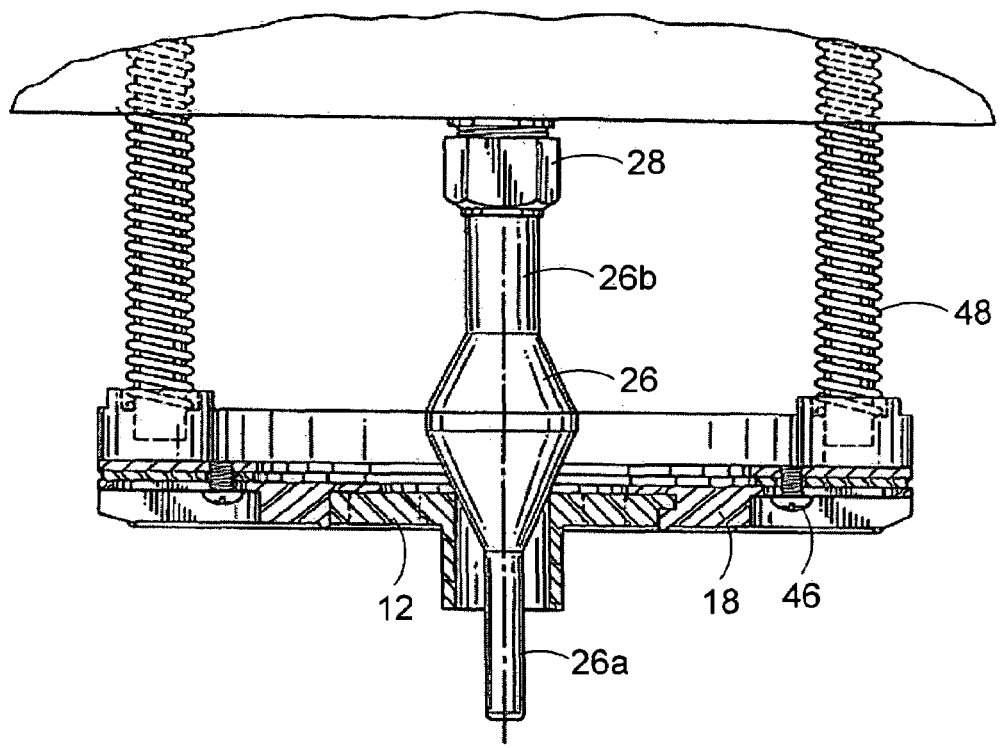
FIG. 5 illustrates a second step in aligning the universal router guide bushing of FIG. 1.
Figure 6:
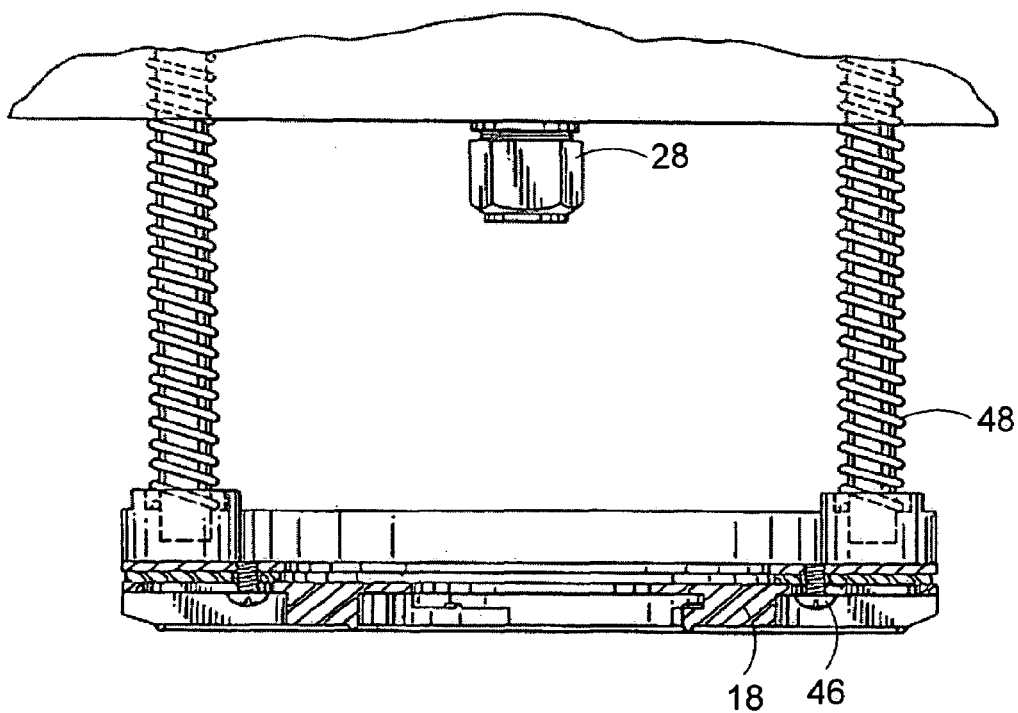
FIG. 6 illustrates a third step in aligning the universal router guide bushing of FIG. 1.
Figure 7:
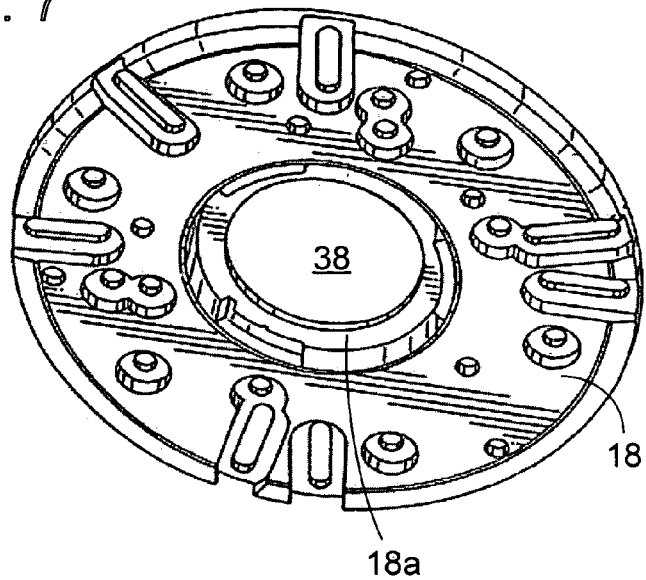
FIG. 7 is a perspective view of an adapter plate of the present invention.
Figure 8:
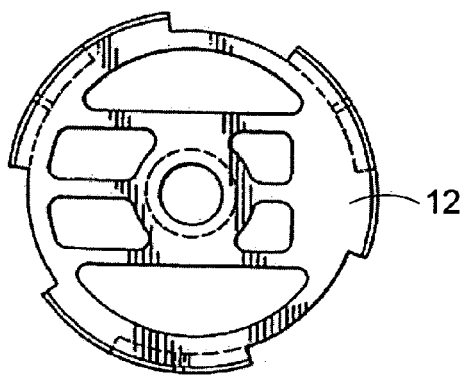
FIG. 8 is a top view of a guide bushing of the present invention.
Figure 9:
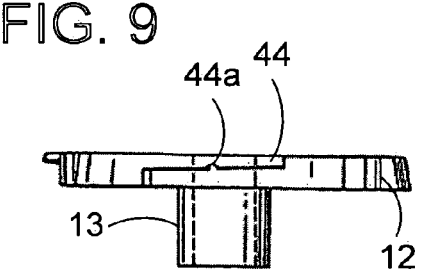
FIG. 9 is a side view of the guide bushing of FIG. 8.
Figure 10:
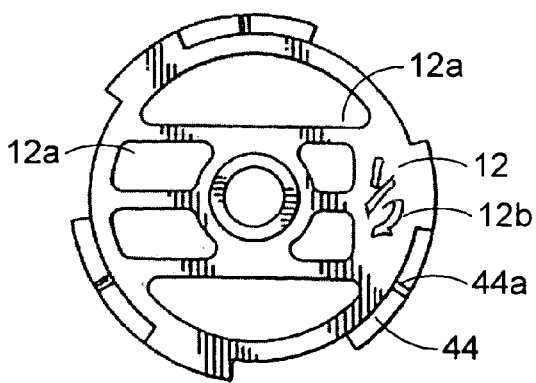
FIG. 10 is a bottom view of the guide bushing of FIG. 8.
Figure 11:
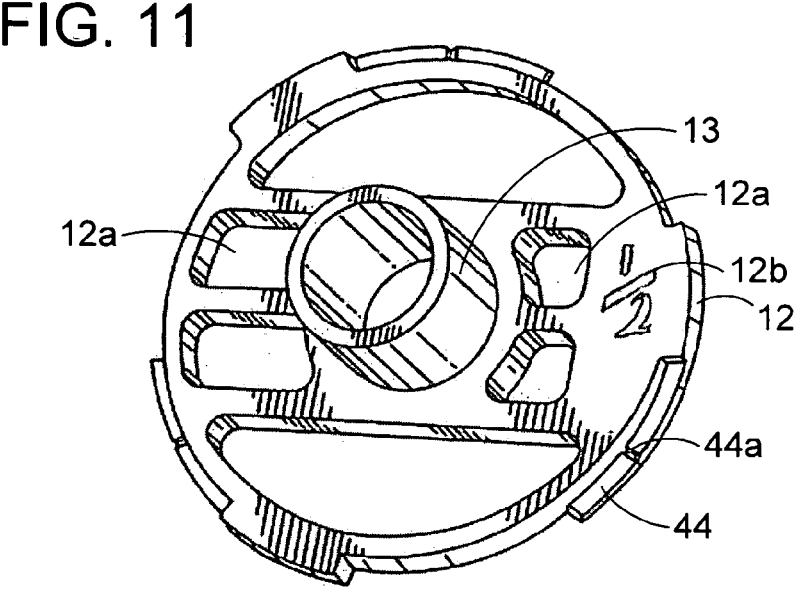
FIG. 11 is a perspective view of the guide bushing of FIG. 8.
Figure 12:
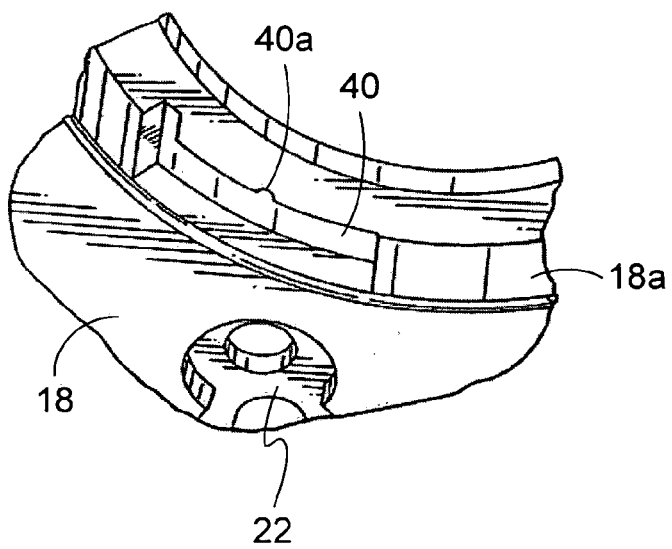
FIG. 12 is a partial view of the adapter plate.
Figure 13:
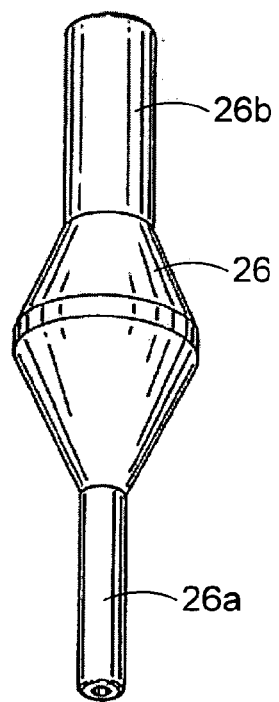
FIG. 13 is a perspective view of a centering pin of the present invention.
Figure 14:
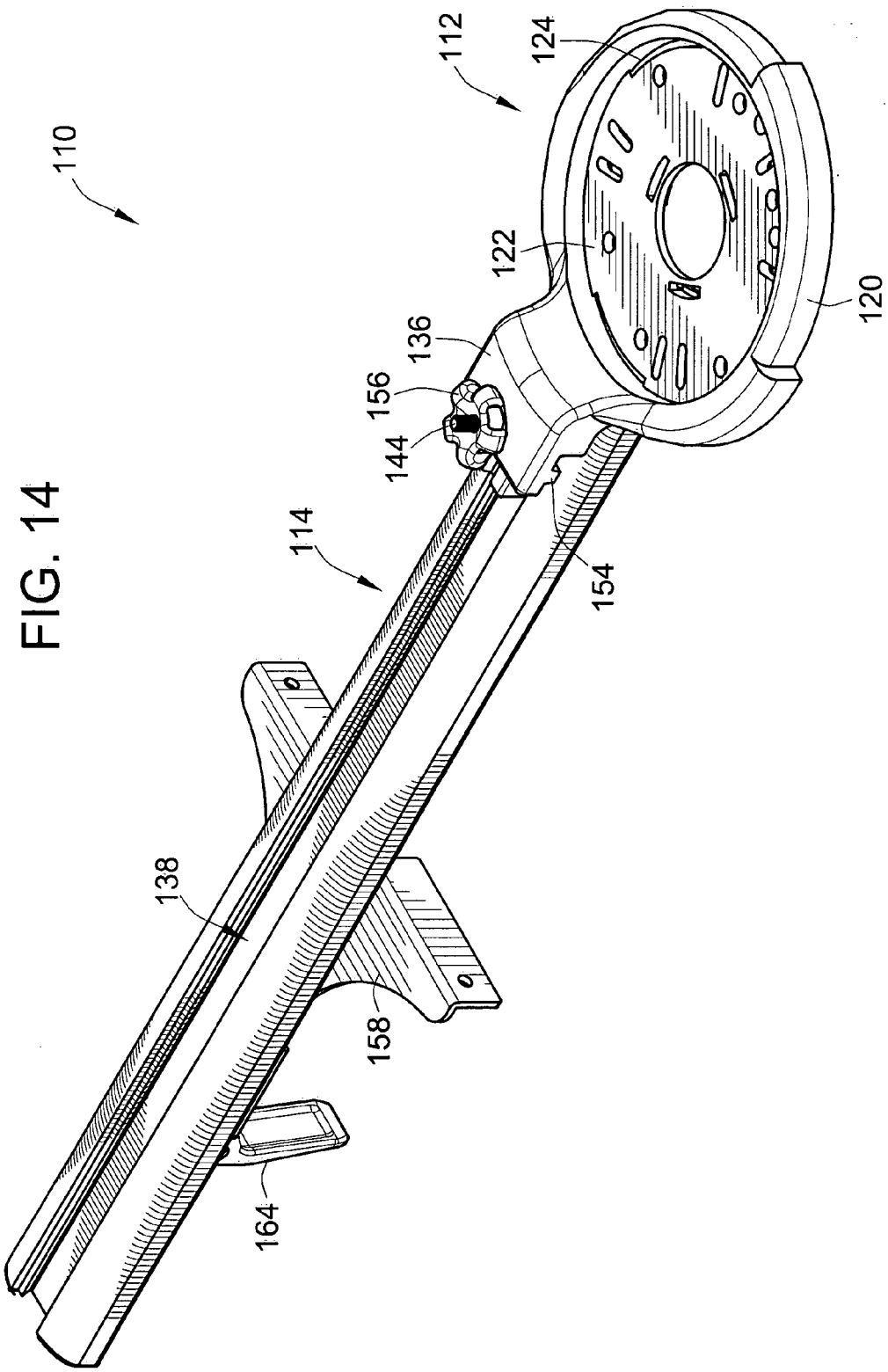
FIG. 14 is an isometric top view of an adjustable router guide attachment in accordance with an embodiment of the present invention.
Figure 15:
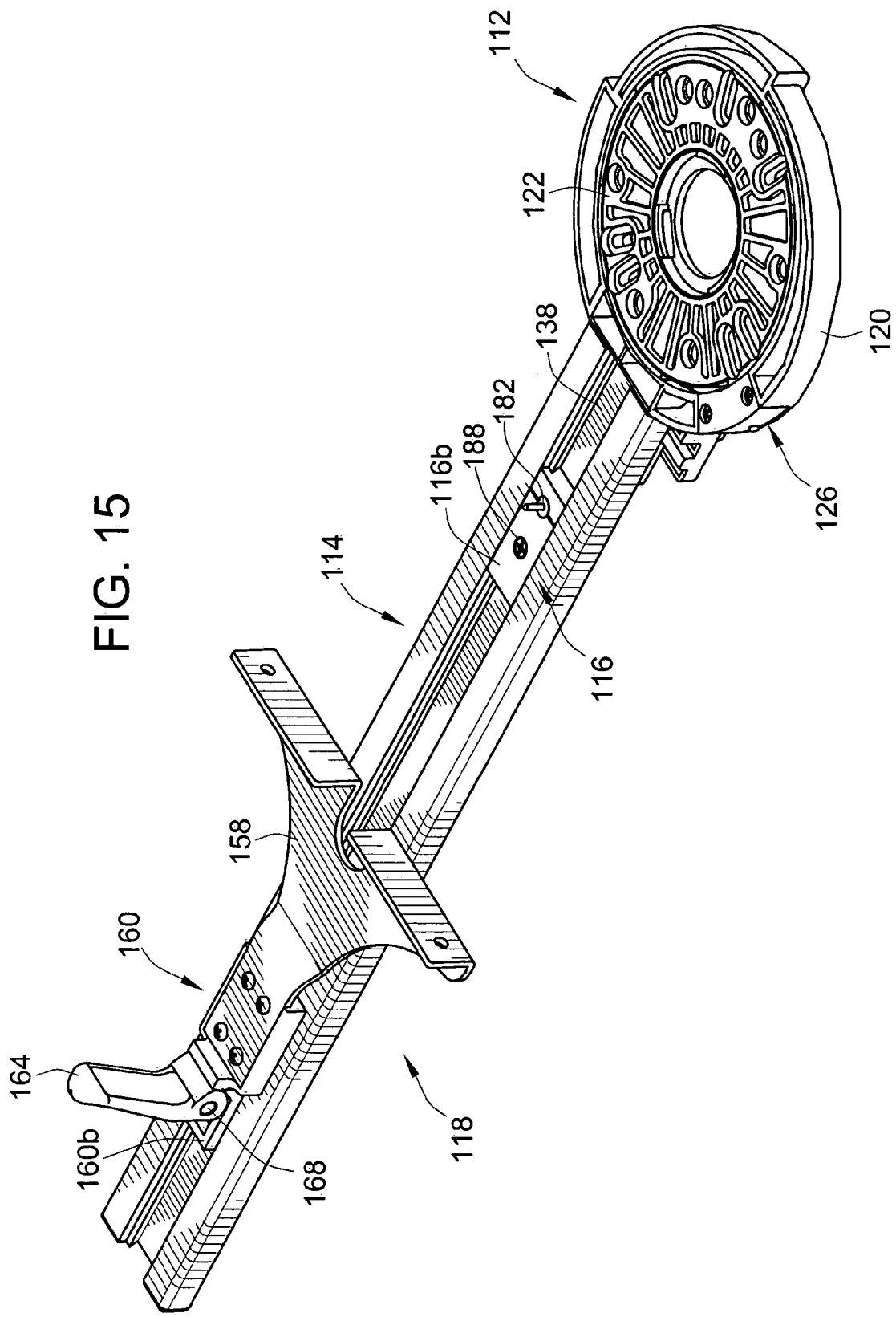
FIG. 15 is an isometric bottom view of the adjustable router guide attachment shown in FIG. 14.
Figure 19:
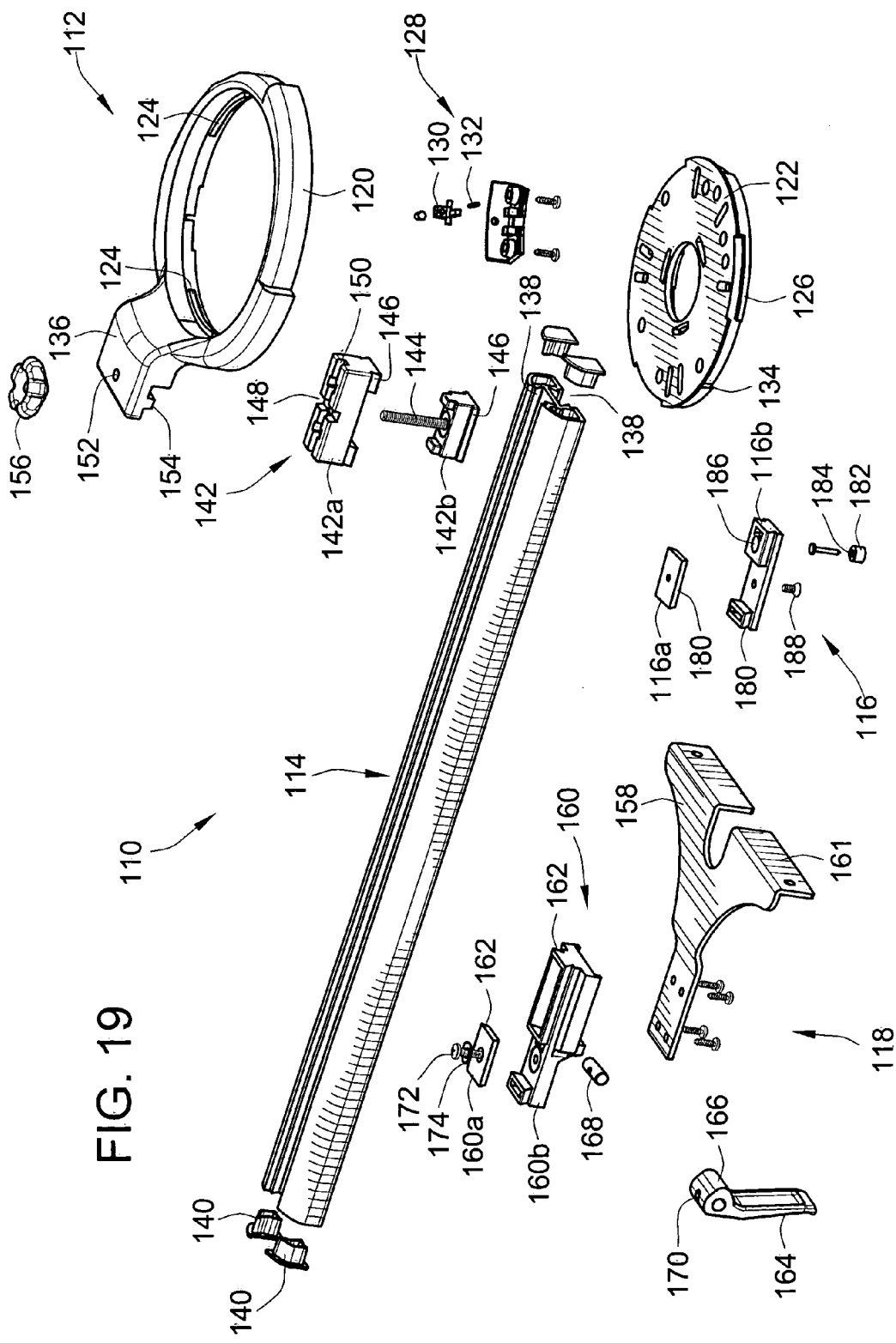
FIG. 19 is an exploded isometric assembly view for the adjustable router guide attachment shown in FIG. 14.

To mount the guide bushing 12 to the router base plate 23, first the guide bushing 12 is secured to the adapter plate 18 (FIGS. 3 and 4). The adapter plate 18 is then loosely attached to the router base 23 with a plurality of screws 46. The centering bit 26 is provided and its first end 26a is secured in the chuck. The base plate is biased by three springs 48. The spring biased base plate 23 is then depressed (FIG. 5), causing the centering portion of the centering bit 26 to enter the guide bushing 12 to center the guide bushing 12 relative to the centering pin 26. The adapter plate 18 is then secured to the base plate 23 by tightening the screws 46.

The router guide bushing 12 includes four apertures 12a, for improved visibility. Two of the apertures 12a are smaller, to provide space for indicia 12b, indicative of the diameter of the cylindrical extension 13.

With the present invention, retailers no longer must stock guide bushings for many different base plate configurations. Rather, all they need do is stock the universal adapter plate, and guide bushings for the universal adapter plate. Additionally, once the adapter plate 18 is in place on the router 14, other guide bushings 12, having different cylindrical extension diameters, can be readily interchanged.

Turning to a second embodiment of the present invention, an adjustable router guide attachment 110 for a router 111 is shown in the FIGS. 14–22. The attachment 110 generally includes a router mounting adapter 112, a rail 114, a center pilot member 116, and a edge guide assembly 118.

The router mounting adapter 112 preferably comprises a quick attachment and release type of adapter as shown, which may comprise a locking and release mechanism that may be similar to that disclosed and taught in U.S. Patent Application No. 60/446,871, entitled "Universal Router Guide Bushing Adapter And Method" filed on Feb. 12, 2003, and as such the entire disclosure of this application is hereby incorporated by reference. The router mounting adapter 112 includes a collar 120 and a mounting plate 122, both of which may be formed of plastic material, or cast from metal material for heavier duty construction. The mounting plate 122 includes bolt holes that facilitate bolting of the mounting plate 122 to the end face of the router 111 generally concentric or coaxial about the router's spindle.

The mounting plate 122 includes retainers in the form of angularly spaced threads 124 on the outer periphery thereof, which are received by corresponding retainers in the form of angularly spaced threads 126 on the inner periphery of the collar 120. Engagement of the threads 124, 126 or other suitable form of retainers, provides for axial retention. In addition, a rotational lock 128 is provided between the collar 120 and the plate 122, which may comprise a movable catch or latch 130 which may be loaded via a spring 132 to releasably lock into a corresponding stop 134 such as a thread end face, snag or divot. In this embodiment, the spring loaded latch 130 is mounted to the collar 120, while the end stop 134 (and preferably multiple end stops 134 are provided to allow for different angular orientations although only one stop surface is needed for rotational locking) is formed in a corresponding location along the radial periphery mounting plate 122. By rotating the mounting plate 122 relative to the collar 120, the mounting plate 122 (and thereby the router 111) is removably and releasably secured to the collar 120 to provide for quick attachment and detachment of the router guide attachment 110.

It will be appreciated that the plate 122 may not be sold as part of the adjustable router guide attachment 110, since this plate 122 may be integrated into the end face of the router 111 rather than provided as a separate plate. Also, the plate may be provided from another application, e.g., such a bushing guide, and therefore another plate may not need to be provided, but only the collar 120 which interfaces and releasably locks with the plate 122. Also, the mounting adapter could take other forms such as bolting or otherwise securing the rail directly to router, but such alternatives are less preferred.

The collar 120 has a projecting mounting flange 136 to which the rail 114 is mounted 136. The rail 114 may be formed as an aluminum extruded member with dovetail or other locking type grooves 138 on opposed sides. Plastic end caps 140 may cover ends of the rail 114. To mount the mounting flange 136 of the collar 120 to rail 114, a dovetail slidable bar segment 142 is provided, which is an assembly of upper and lower component parts 142a, 142b is provided.

Each component part 142a, 142b of the bar segment 142 includes a dovetail profile 146 that is adapted to slide linearly within the dovetail groove 138 of the rail 114. The bar segment 142 includes a vertically extending shaft 144 (e.g. the threaded shaft of a bolt retained by the lower component) that is received through a corresponding hole 152 in the mounting flange 136. The top face of the slidable bar segment includes a pair of perpendicularly intersecting slots 148, 150 in the shape of a cross. The mounting flange 136 includes a complementary block portion 154 projecting vertically that is received into either of the slots 148, 150. To secure the collar 120, the mounting flange 136 is arranged on the bar segment 142, with the threaded shaft 144 projecting through the hole 152 and the block portion 154 received in one of the complementary slots 148, 150. A thumb screw 156 is threaded on the shaft 144 to attach the collar 120 and tightened to fix the position of the collar 120 relative to the rail 114. In particular, when the thumb screw 156 is not tightened down, the bar segment 142 and therefore the collar 120 may be linearly movable relative to the rail 114 through sliding contact between complimentary dovetail surfaces. However, when the thumb screw 156 is tightened, the upper segment component part 142a is forced downwardly and the lower segment component part 142b is forced upwardly wedging the components in the rail 114 and in effect clamping collar 120 in a fixed position relative to the rail 114.

Another aspect of the disclosed embodiment is directed toward the feature of a selectively movable edge guide assembly 118. This assembly 118 includes a linear edge guide 158 which may be formed from stamped sheet metal to provide a guide surface 161 extending in plane generally perpendicular to the linear axis of the rail 114. The linear edge guide 158 is secured to a bar segment 160, which itself comprise two component parts 160a, 160b, each of which includes of a complimentary dovetail profile 162 that is adapted to slide linearly within the dovetail groove 138 of the rail 114.

Figure 20:
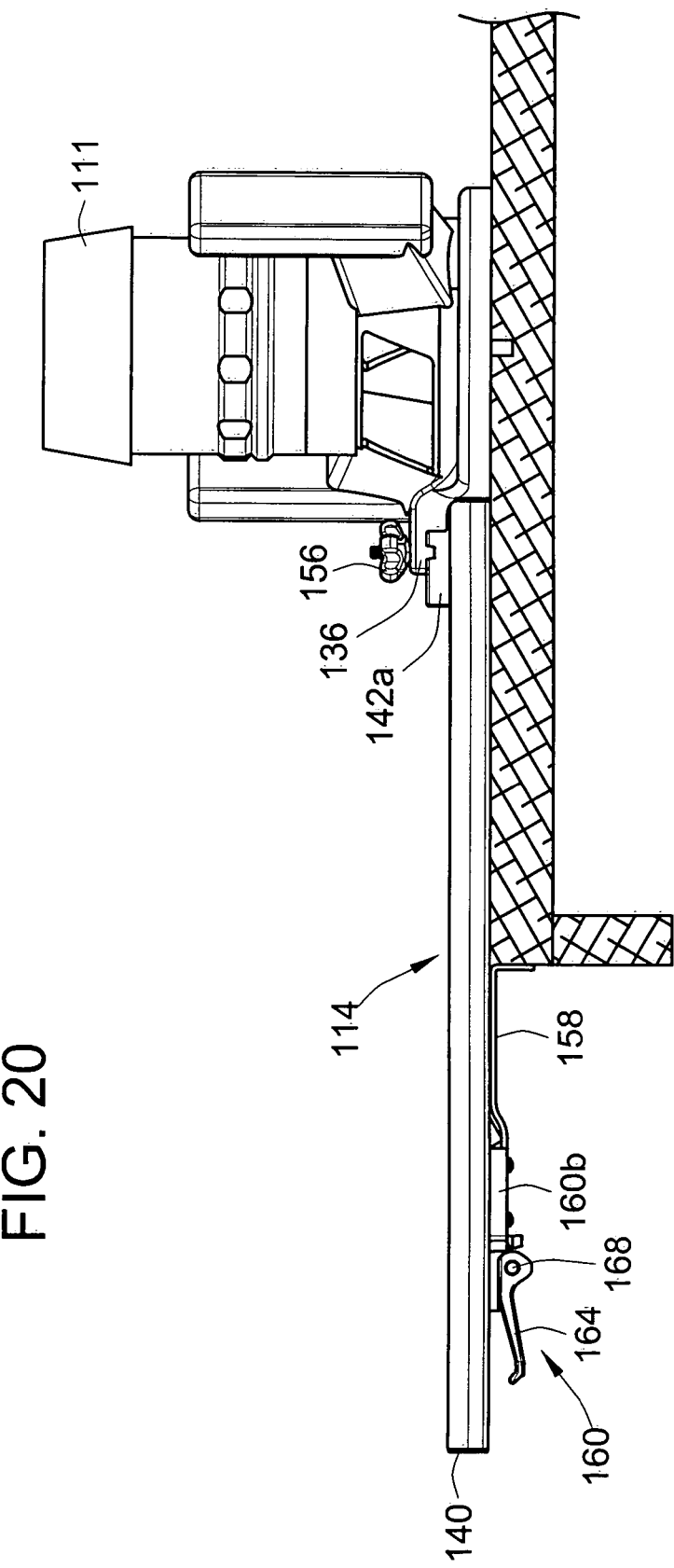
FIG. 20 is a side profile view of the adjustable router guide attachment shown in FIG. 14, with a router attached thereto, being used as an edge guide.

A handle 164 is provided that is extendible and retractable (see e.g. FIGS. 16 and 20). The handle 164 may also be part of a clamping mechanism which may be used to releasably secure the edge guide assembly 118 to selectively adjust position. The handle 164 is pivotally mounted to a pivot pin 168, which is secured to the upper component part 160a via a screw 172 extending through the lower component part 160b. The screw 172 is biased in one axial direction via a spring washer 174. The handle includes a slot 170 to allow for pivoting movement of the handle relative to the pivot pin 168 and an eccentric cam surface 166 that rides against the bottom surface of the lower component part 160b.

When the handle 164 is retracted, the bar segment 160 is relaxed allowing edge guide assembly 118 to be linearly moved and repositioned to the rail 114 through sliding contact between complimentary dovetail surfaces. However, when the handle 164 is moved to an extended position, the cam surface 166 engages the bottom surface of the bar segment 160, causing the upper segment component part 160a to be forced downwardly and the lower segment component part 160b to be forced upwardly wedging the components in the rail 114 and in effect clamping the edge guide assembly 118 in a fixed position relative to the rail 114.

Another aspect of the disclosed embodiment is directed toward the feature of a centering pilot member 116 which comprises two component parts 116a, 116b, each of which includes a complimentary dovetail profile 180 that is adapted to slide linearly within the dovetail groove 138 of the rail 114. The centering pilot member 116 also includes a cylindrical bushing 182 with a central through hole 184 that is adapted to be nailed or screwed or otherwise fastened to a working surface. The bushing 182 is received in a cylindrical cavity 186 of the member 116 to provide for rotation/pivoting movement therebetween.

A screw 188 is threaded into a threaded hole in the upper component part 116a and may be tightened to fix the position of the centering pilot member 116 relative to the rail 114. In particular, when the screw 188 is not tightened down, the centering pilot member 116 may be linearly movable relative to the rail 114 through sliding contact between complimentary dovetail surfaces. However, when the screw 188 is tightened, the upper segment component part 116a is forced downwardly and the lower segment component part 116b is forced upwardly wedging the components in the rail 114 and in effect clamping the centering pilot member 116 in a fixed position relative to the rail 114.

Figure 21:
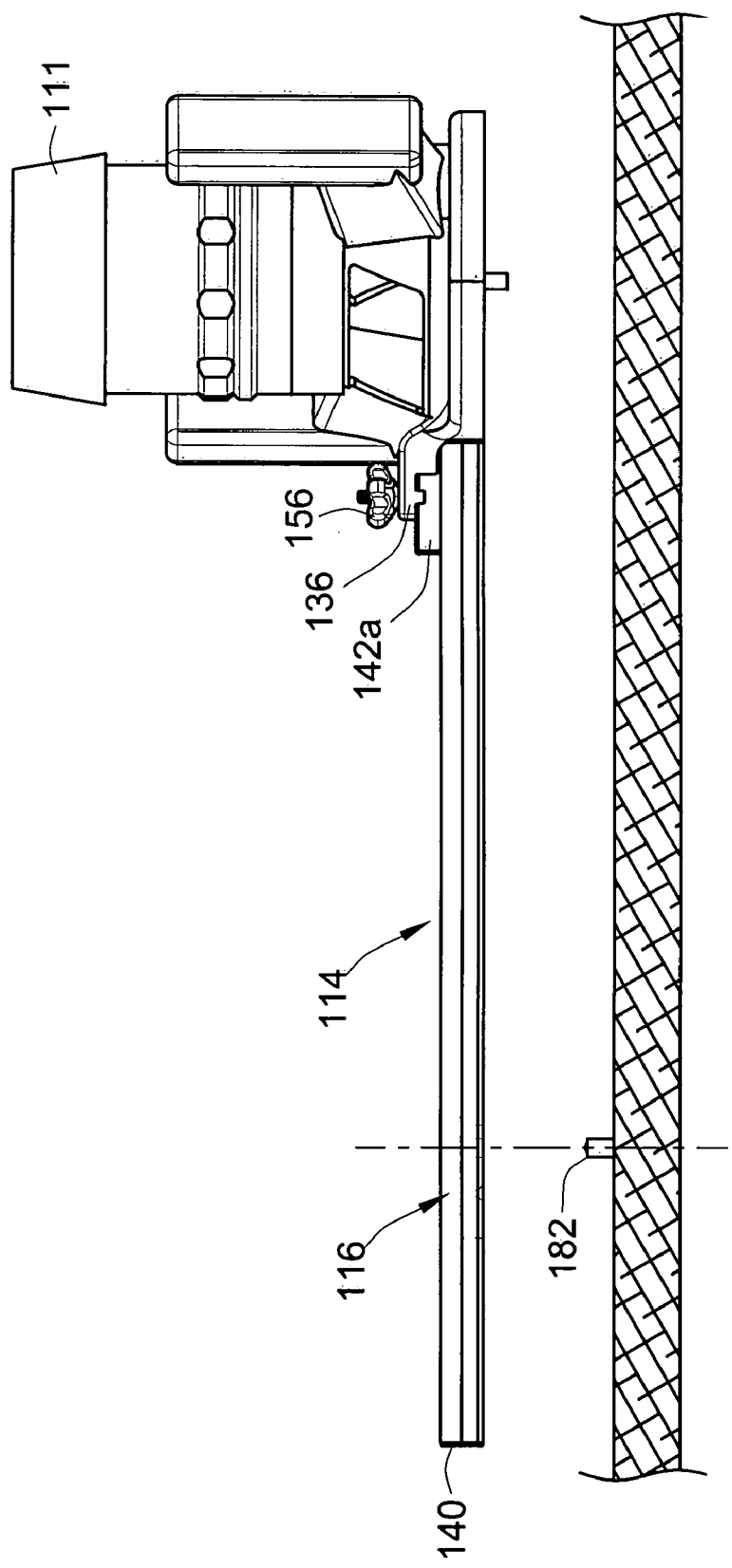
FIG. 21 is a side profile view of the adjustable router guide attachment shown in FIG. 14, with a router attached thereto, being used as a circle compass.
Figure 22:
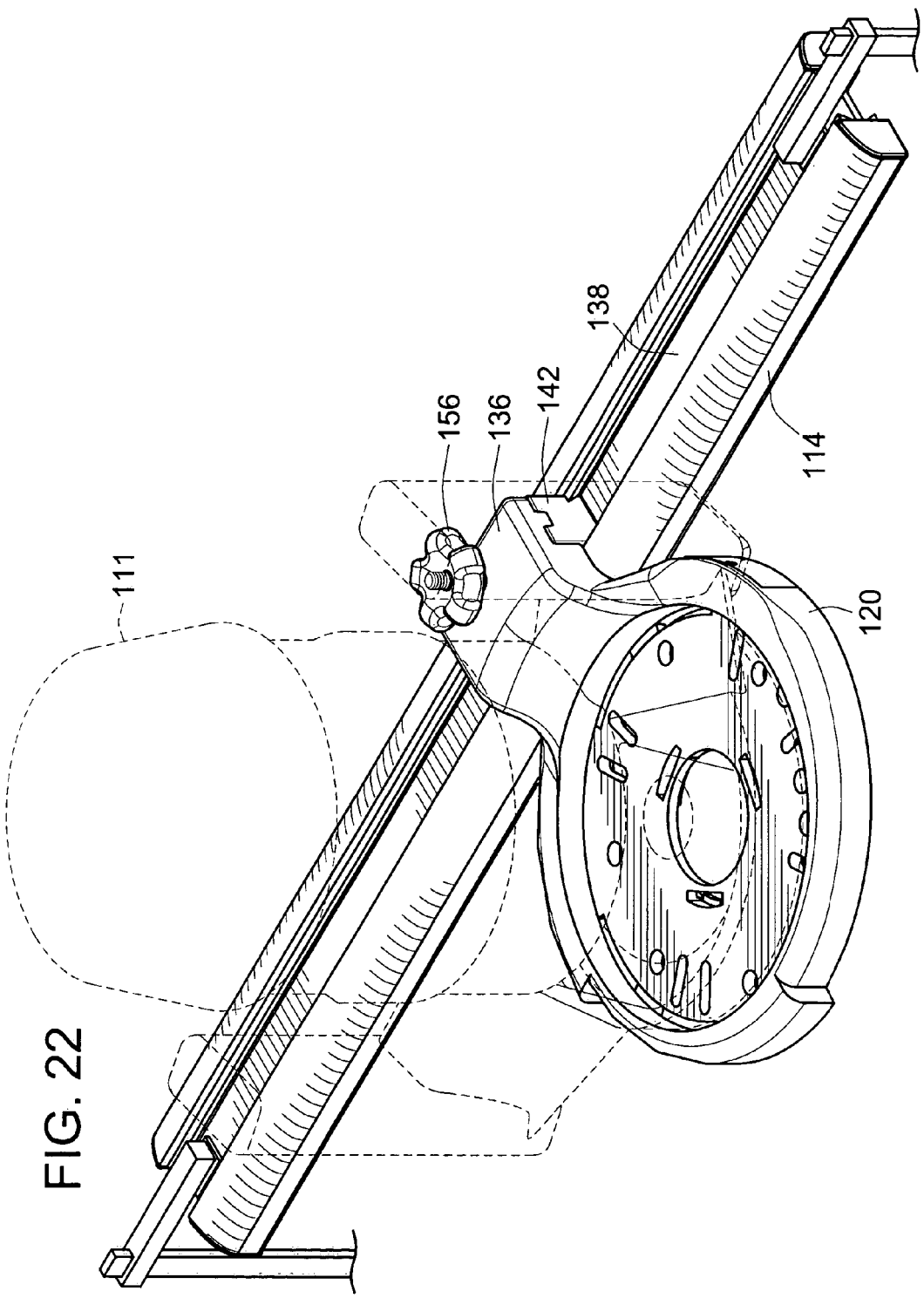
FIG. 22 is a side profile view of the adjustable router guide attachment shown in FIG. 14, with a router attached thereto shown in dashed lines, with opposed ends of the rail clamped such that the rail is being used as a linear sliding guide.
Figure 23:
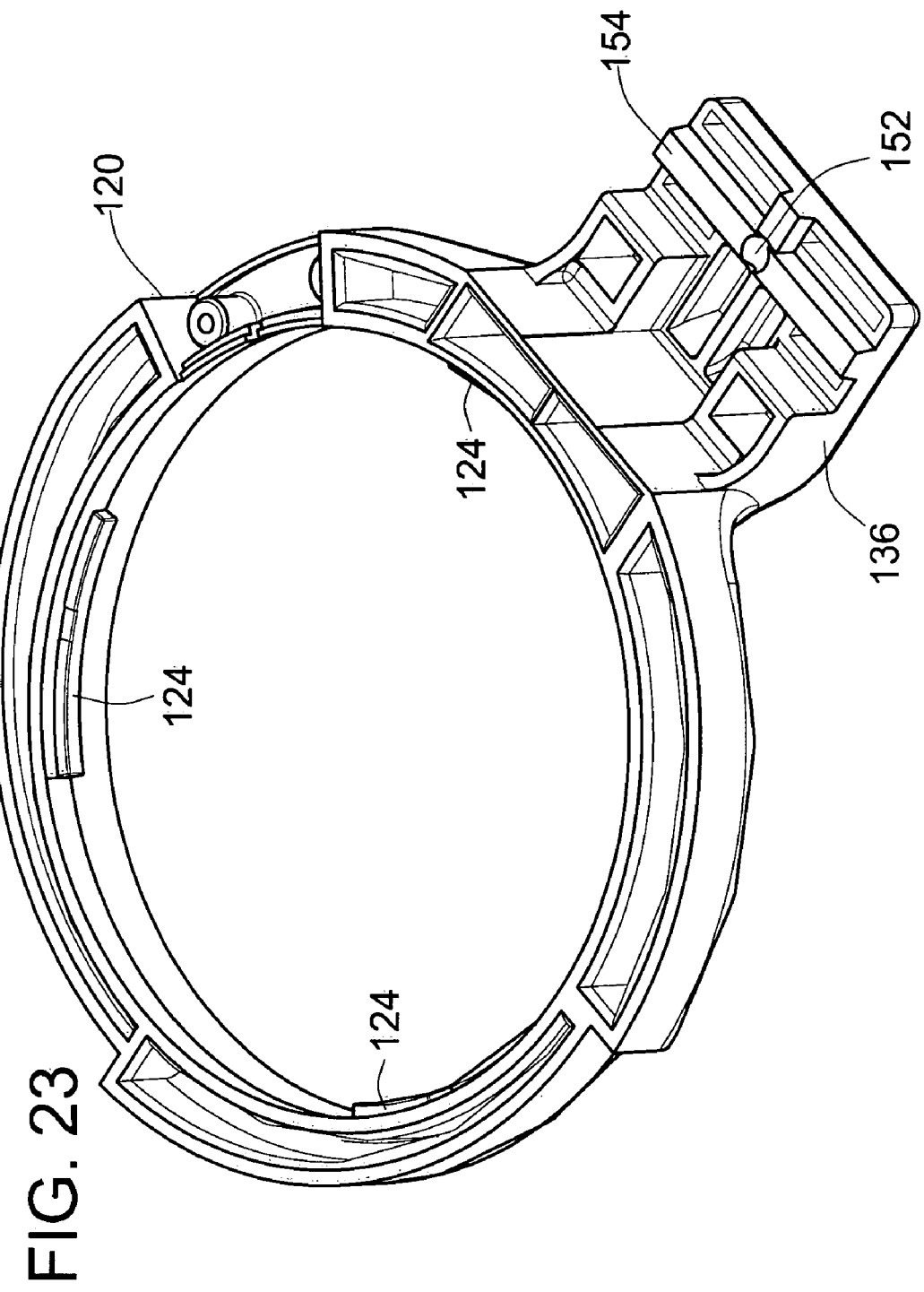
FIG. 23 is a bottom view of the collar of the adjustable router guide attachment shown in FIG. 14.
Figure 24:
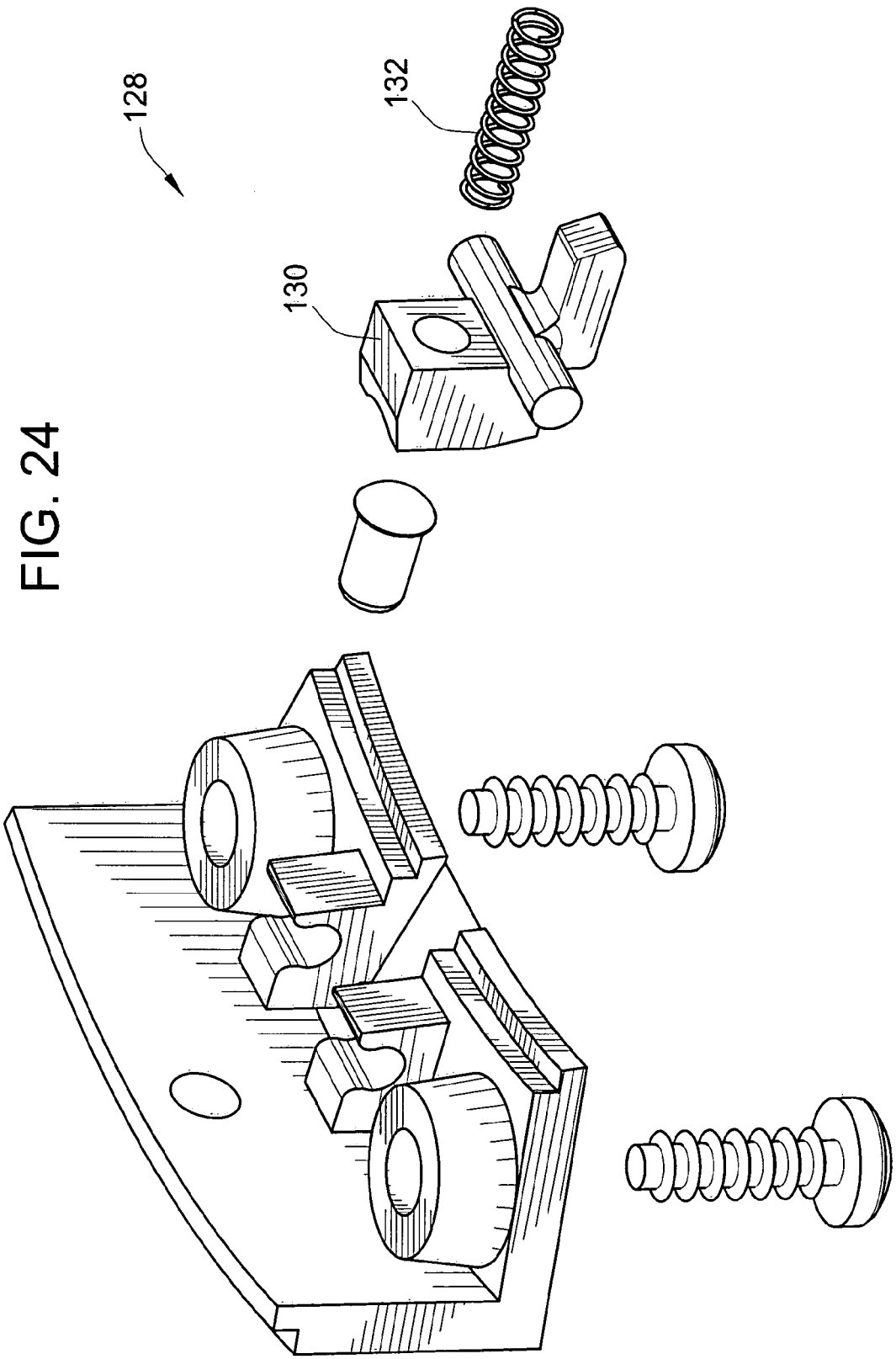
FIG. 24 is an enlarged view of the locking mechanism shown in FIG. 19.
Figure 27:
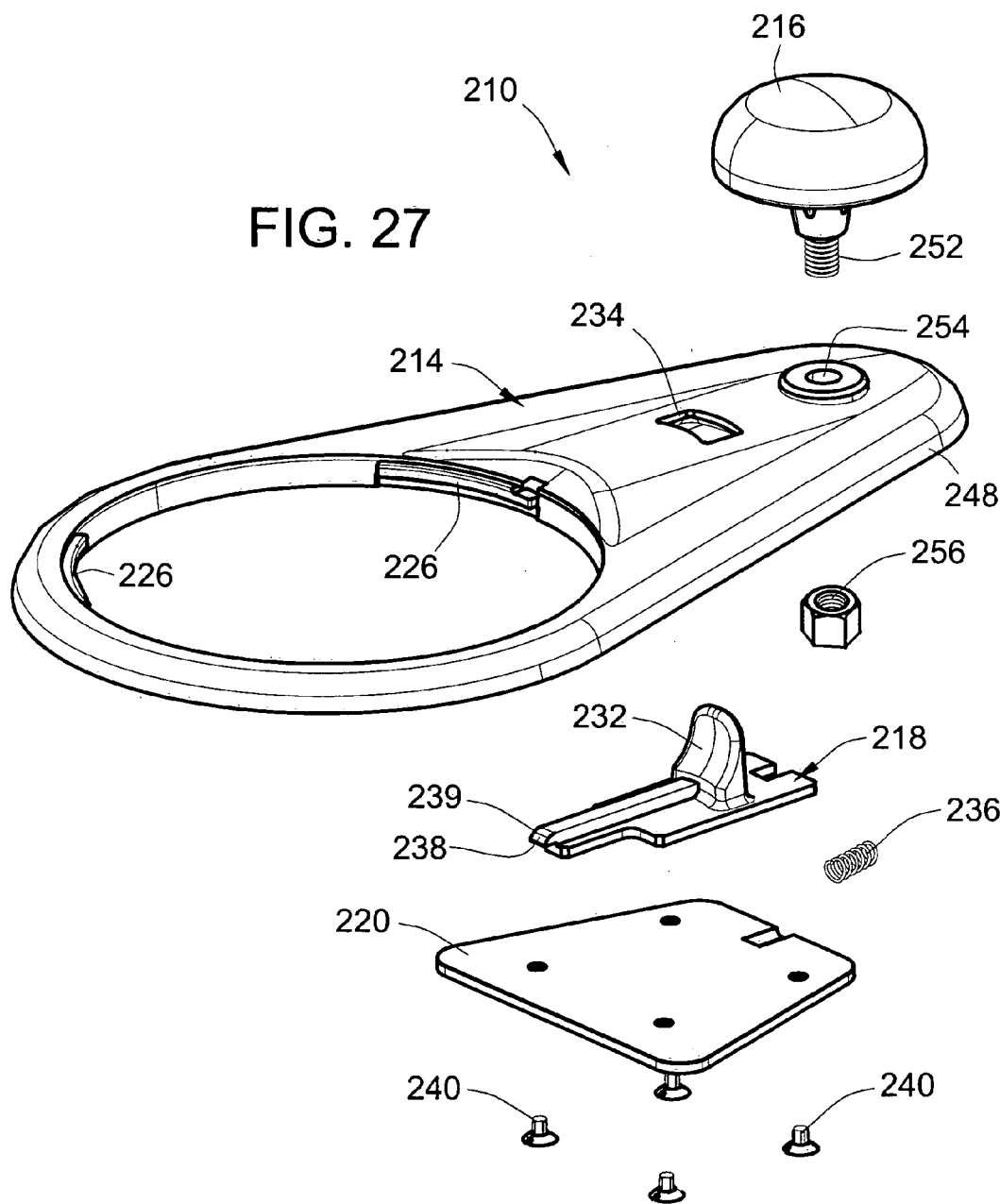
FIG. 27 is an exploded isometric assembly view of the router guide attachment shown in FIG. 25.

With the foregoing arrangement, the disclosed embodiment of the router guide attachment 110 is versatile and has different operational modes. As shown in FIG. 20, the edge guide assembly 118 may be used to provide a predetermined spacing between the router 111 and an edge of a workpiece, with the edge guide 158 contacting the workpiece edge. The position of the edge guide assembly 118 can be adjusted as described above to provide the desired spacing. A linear scale (not shown) may be provided along the rail to indicate spacing. Another operational mode is shown in FIG. 21, wherein the router guide attachment 110 is being used as a circle compass to provide for circular cutting action about a fixed point. The bushing 182 can be fastened to the working surface to provide this fixed point. While in this mode, the edge guide assembly 118 may be removed or affixed to the top side of the rail, out of the way. A third mode has been shown in FIG. 22 in which the rail is used as a linear sliding guide. To accomplish this mode, the collar 120 can be released from the bar segment 142, rotated about ninety degrees and then secured back to the bar segment 142 (with the thumb screw 156 snug but not tightened). This allows for linear movement of the router 111 relative to the rail 114 and can be used to make linear cuts in a workpiece at any desired location. To hold the rail 114 stationary, one or more clamps (e.g. C-clamps) may be used to temporarily fix the position of the rail 114 to the workpiece to complete the desired cut.

Figure 33:
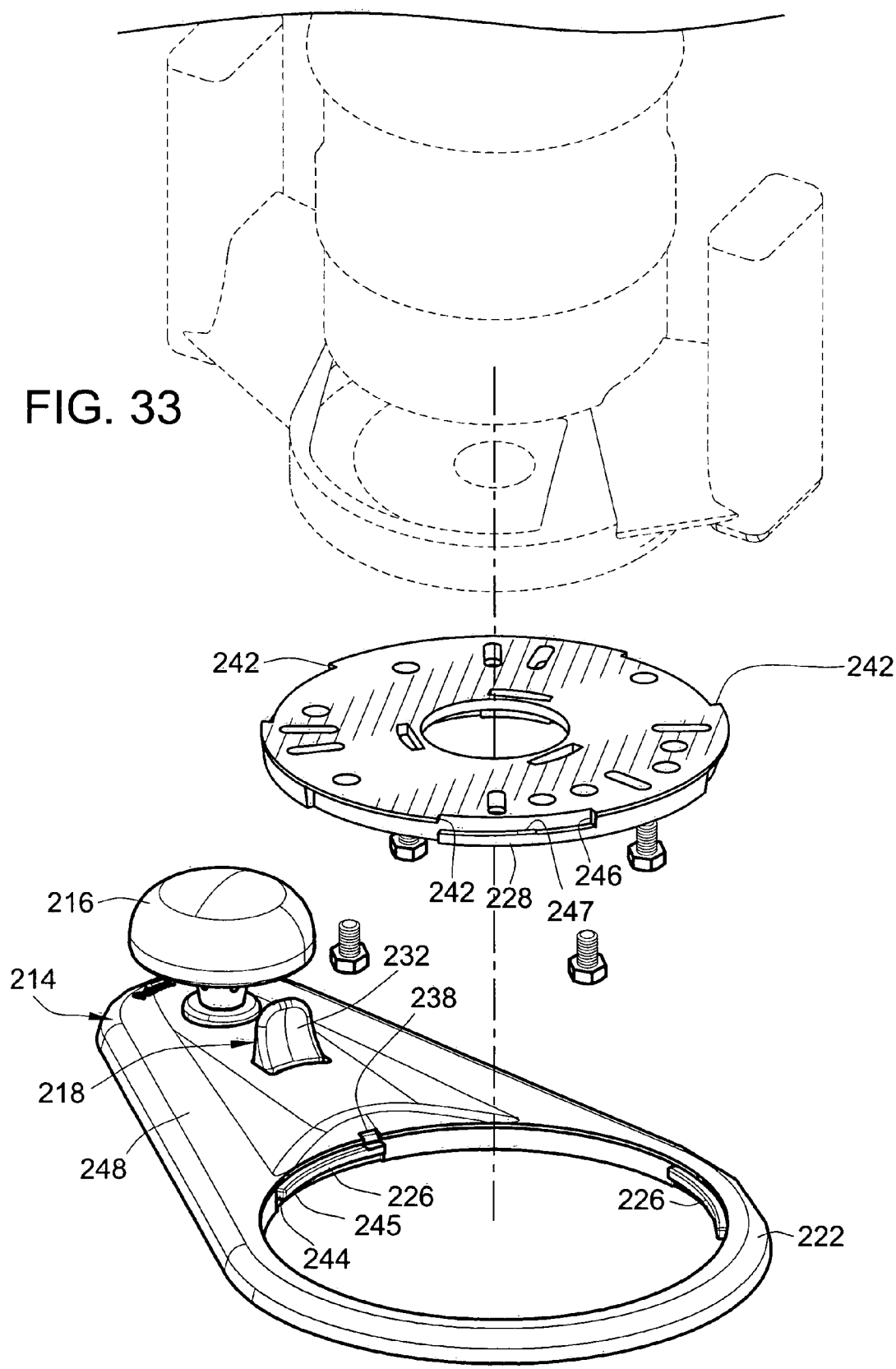
FIG. 33 is an isometric exploded view showing how the router guide attachment is mounted to a router.
Figure 34:
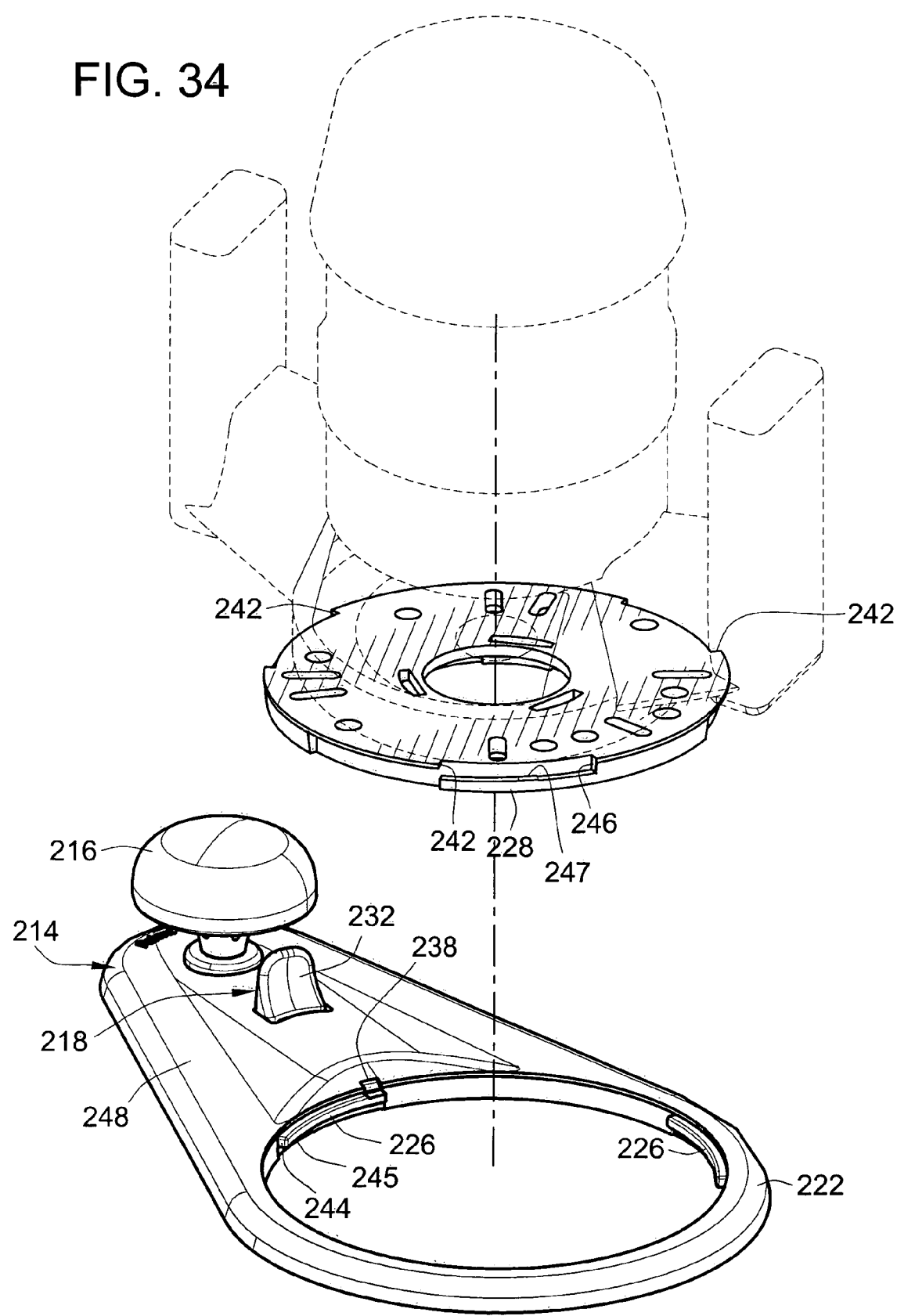
FIG. 34 is a view similar to FIG. 33 except the mounting plate is shown integral with the router.

Turning to a third embodiment of the present invention, a router guide attachment 210 as shown in FIGS. 25–32 attaches and detaches with a router 212 as shown in FIG. 33. The attachment 210 includes several component parts including a housing 214, a handle 216, a lock actuator 218, and a retention plate 220.

As shown, a router guide attachment preferably comprises a quick attach and release type mounting adaptor as shown, which may comprise a locking and release mechanism that may be similar to that disclosed and taught in U.S. Provisional Patent Application Ser. No. 60/446,871, entitled "Universal Router Guide Pushing Adaptor And Method" filed on Feb. 12, 2003 or U.S. Provisional Patent Application Ser. No. 60/505,275, entitled "Adjustable Router Guide" filed on Sep. 23, 2003, and as such the entire disclosures of these applications are hereby incorporated by reference. To facilitate quick attachment and detachment, the housing 214 includes a collar portion 222 that is adapted to rotatably engage a relatively flat circular mounting plate 224 (see FIG. 33). Both the collar 222 and the mounting plate 224 may be formed of plastic material, or cast from metal material for heavier duty construction. Mounting plate 224 includes bolt holes with the facilitating bolting of the mounting plate 224 to the end face of the router 212 generally concentric or coaxial about the router spindle. It will be readily appreciated that alternatively, the end face of the router may unitarily provide the mounting plate 224 (e.g., the mounting plate 224 may be unitarily formed into the housing of the router 212 and therefore a separate plate component may not be needed).

Mounting plate 224 provides for vertical retention through the provision of a plurality of angularly spaced flanges in the form of threads 226 on the outer circular periphery thereof, which are received by and are adapted to engage corresponding flanges in the form of angularly spaced threads 228 on the inner circular periphery of the collar portion 222. Engagement of the threads 226, 228 thereby provides for axial or vertical retention, preventing relative vertical or axial movement of the router 212 (with mounting plate 224 attached), and the router guide attachment 210, once the corresponding threads 226, 228 are rotated into engagement with one another. Referring to FIG. 35, vertical retention is further provided by corresponding chamfered surfaces 227, 229 on the collar portion 222 and the mounting plate 224 that prevent the mounting plate 224 from dropping through the collar portion 222. Alternatively, the mounting plate could include a radially outward extending top flange that may rest on the top side of collar portion 222 to provide for this retention feature.

Figure 28:
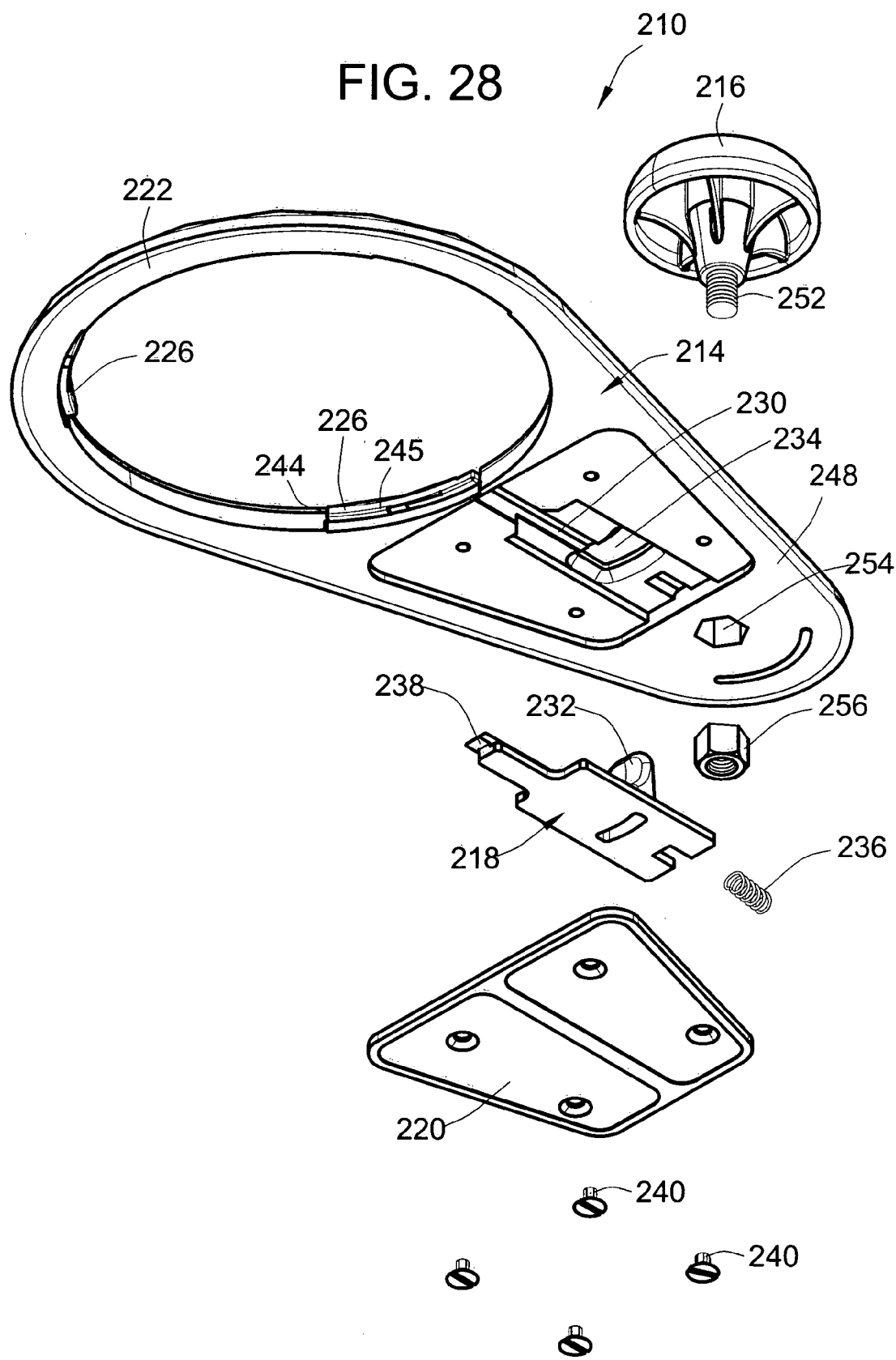
FIG. 28 is another exploded isometric assembly view of the router guide attachment shown in FIG. 25, but with this illustration being shown from the bottom side.
Figure 29:
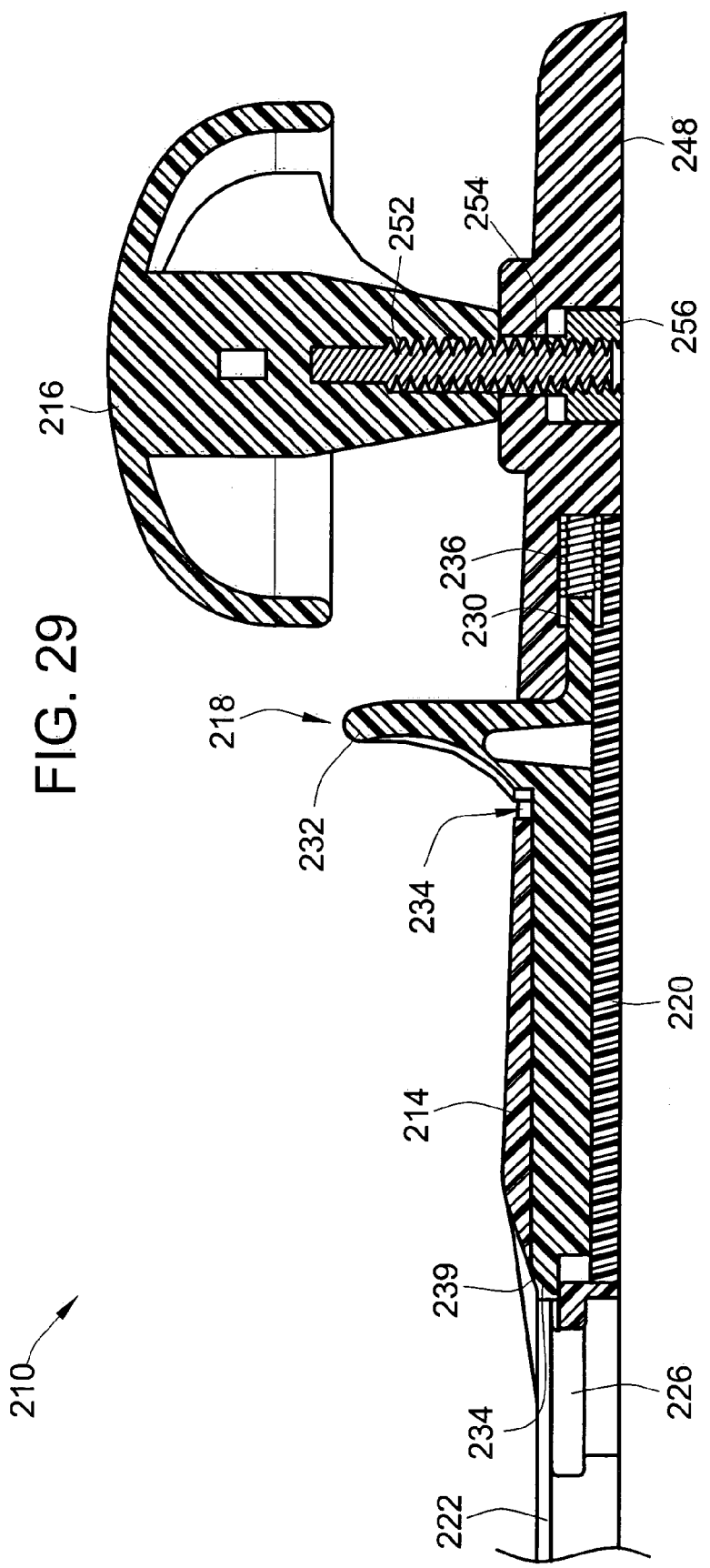
FIG. 29 is a cross-sectional view of the router guide attachment better showing the configuration and operation of the spring loaded actuator mechanism.
Figure 30:
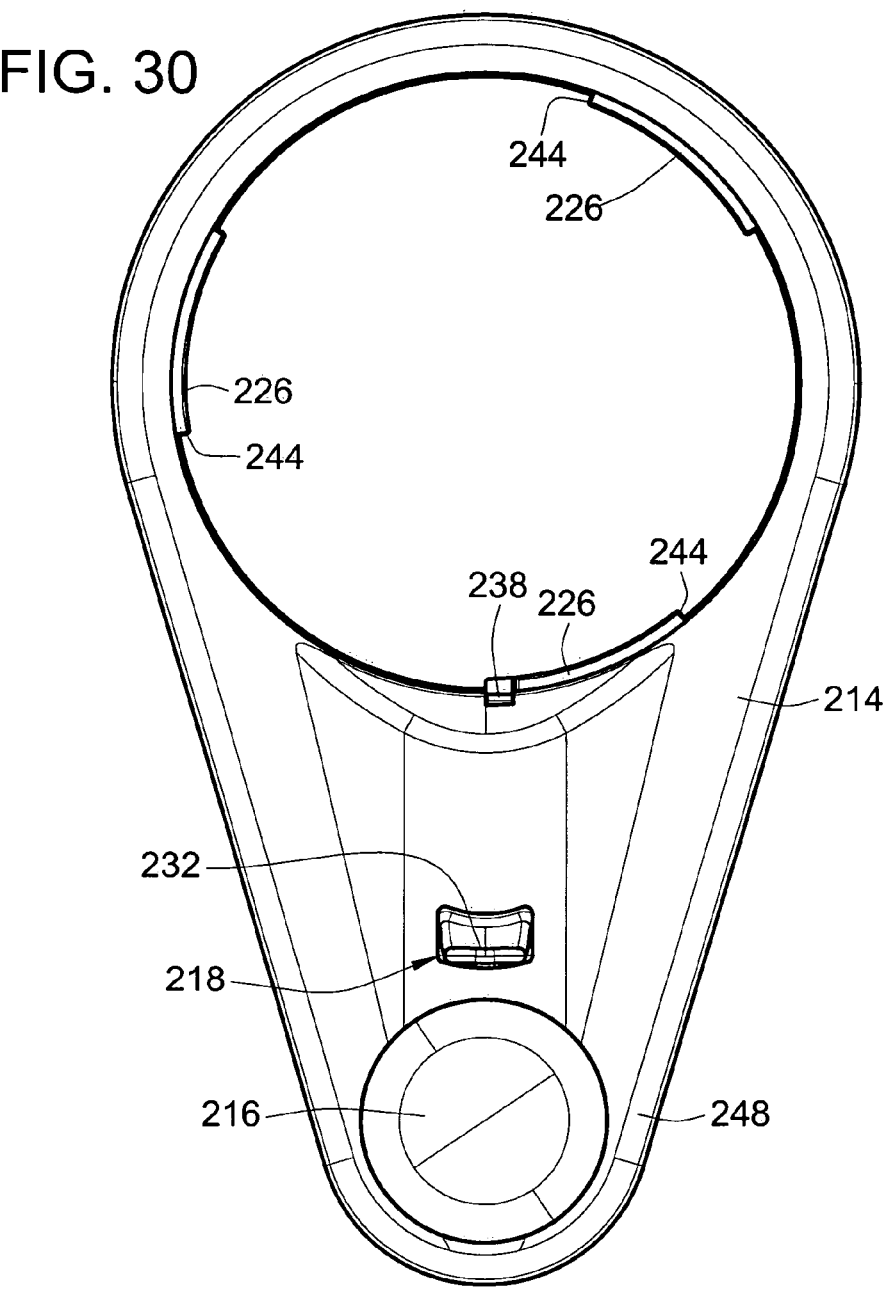
FIG. 30 is a top view of the router guide attachment.
Figure 31:
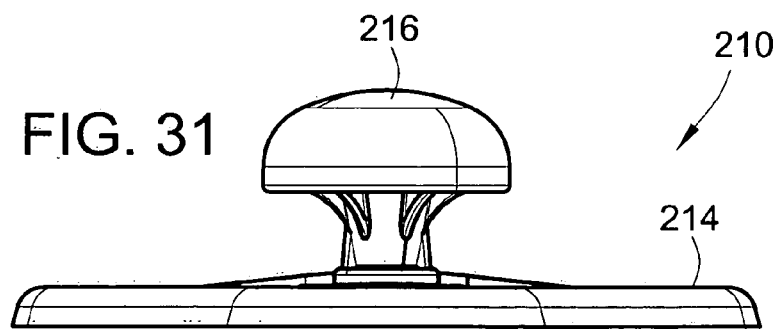
FIG. 31 is an end view of the router guide attachment.
Figure 32:
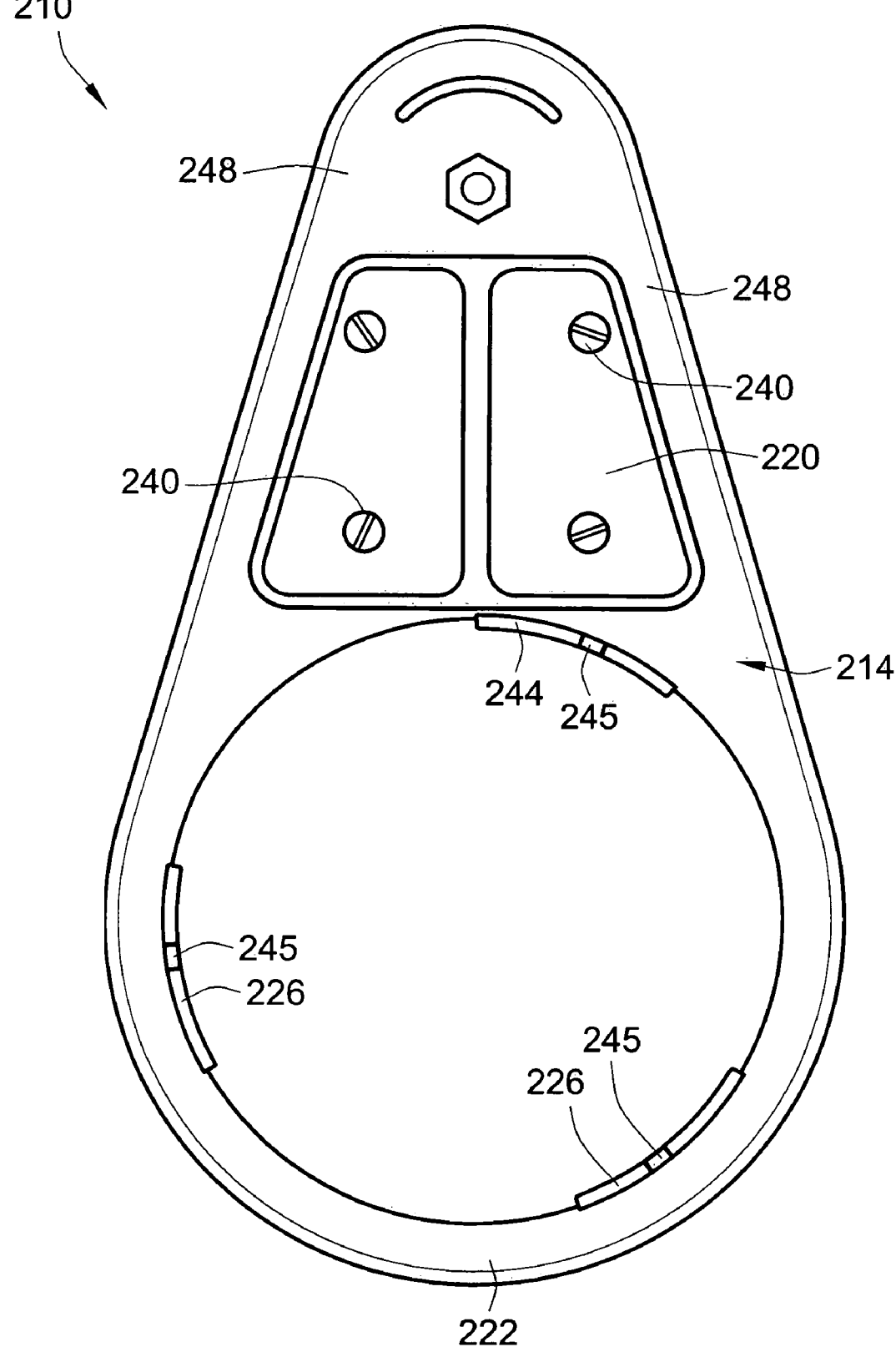
FIG. 32 is a bottom view of the router guide attachment.

In addition to vertical retention, a rotational lock is provided in the form of the spring loaded lock actuator 218. As shown in FIG. 28, the actuator is mounted into a bottom side cavity 230 formed into the underside of the housing 214. The cavity 230 is in the shape of a track to provide for sliding lateral reciprocating movement of the lock actuator 218. The actuator 218 includes a finger pull tab 232 which extends through a slot 234 to be exposed along the topside of the housing 214. A spring 236 supported by the housing (herein shown as a coil spring, but any type of spring including a spring integrally formed with the resilient plastic material of the lock actuator or housing may be used) biases the lock actuator 218 toward the collar portion 222. The lock actuator 218 includes a lock tab 238 at its forward end that projects through an opening through an opening into the circular periphery of the collar portion 222. The finger pull tab 232 can be manually actuated against the action of the spring 236 to retract and advance the actuator and thereby the lock tab 238 as desired. The actuator 218 a spring 236 are secured into the cavity 230 by virtue of the cover plate 220 which is screwed onto the housing 214 with screws 240.

The lock tab 238 provides a stop surface that engages a corresponding stop structure 242 on the mounting plate 224 such as a flange end face as shown, or a snag or divot in the alternative. Preferably multiple end stops structures 242 are provided, one for each different set of threads 226, 228, such that the router 212 can be mounted at a corresponding different number of angular orientations.

To facilitate attachment of the router 212 with the mounting plate 224 mounted thereto, to the guide attachment 210, the mounting plate 224 is set into the collar portion 222 and then relative rotation between the two components is facilitated to cause the threads 226, 228 to rotate pass one another. The lock tab 238 may include a cam surface 239 which engaged, by the outer surface of the mounting plate 224 initially back drives the lock actuator 218 to avoid interference with the rotational movement. Once relative rotation occurs, the lock actuator 218 automatically advances under the spring bias to move the lock tab 238 into locking engagement with the corresponding stop structure 242 once rotating there past to prevent back rotation. In addition, end of movement stops 244, 246 are respectively provided on the collar portion 222 and the mounting plate 224 that come into contact with one another to prevent over rotation of the mounting plate 224 relative to the collar portion 222. At this point, the router 212 and mounting plate 224 are rotationally locked to the housing by virtue of the lock actuator 218 being spring-biased forward and preventing the mounting plate from rotating out of position. At the same time, the corresponding threads 226, 228 axially or vertically retain the housing 214 to the router 212 and mounting plate 224.

A secondary form of lock mechanism is provided in the form of raised ribs which provide snaps 245, 247 on the corresponding threads 226, 228 of the collar portion 222 and mounting plate 224. As these snaps 245, 247 rotate past one another during the rotational movement described above, they snap past each other. This provides a secondary additional means (in addition to lock actuator 218) for rotationally locking the collar portion 222 and the mounting plate 224. Accordingly, it will be readily appreciated that redundant rotational locking means is thereby provided, however, an alternate embodiment of the invention may include only one locking means. The rotational locking facilitated by snaps 245, 247 is facilitated by virtue of the resilient nature of the material selected for the collar portion 222 and/or the mounting plate 224. As such, the rotational locking force provided by the snaps can be overcome radially (by virtue of corresponding cam surfaces on trailing faces of the snaps), which allow the mounting plate 224 to be readily detached from the collar portion 222 with manual force.

When it is desired to release the router guide attachment 210 from the router 212, it can be accomplished relatively easily simply by pulling the finger pull tab 232 thus retracting the lock actuator 218. When this happens, the mounting plate 224 and collar portion 222 are no longer rotationally locked with one another, and the router can be rotated to release the router and mounting plate 224 from the collar portion 220 of the router guide attachment 210.

The third embodiment includes an arm portion 248 extending radially from the collar portion 222. In the outboard of the finger pull tab 232 is a handle in the form of a rotatable knob 216. The knob 216 includes an axially extending threaded shaft portion 252 that is inserted into a hole 254 formed in the housing 214 and is secured thereto by a threaded fastener nut 256 on the underside of the housing 214. The knob 216 can be manipulated by hand to facilitate easier manipulation and positioning of the router when the router guide attachment 210 is mounted thereof.

The above features and quick attachment and detachment system of the various embodiments above may be incorporated into a wide variety of different types of router attachments to include but not limited to edge guides, router tables, dato guides, elipse guides, circle compasses, and/or other such tool attachments. The embodiments shown herein are just some of the potential examples. The above features may also be incorporated into other types of tool attachments, and certain claims are directed toward these aspects.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A router attachment system, comprising:
   a router including a router housing and a spindle, the spindle adapted to revolve relative to the housing about a vertical axis;
   a mounting adapter along an end face of the router housing, the mounting adapter including an annular mounting surface;
   a router attachment including an attachment housing with an annular attachment surface that mates with the annular mounting surface;
   wherein the router attachment is rotatable between a release position and an attach position, the router attachment being removable from the mounting adapter in the release position, the router attachment vertically engaging the mounting adapter in opposing directions along the axis in the attach position for vertical retention of the router attachment;
   a lock locking the router attachment and the mounting adapter in the attach position to prevent relative rotation therebetween, the lock subject to manual actuation to allow rotation between the router attachment and the mounting adapter for detachment of the router attachment from the mounting adapter; and
   wherein the lock comprises an actuator carried by the attachment housing, the actuator movable between a lock position and an unlock position, the mounting adapter including a stop surface engaging the actuator in the lock position to prevent relative rotation between the router attachment and the mounting adapter, the actuator being manually movable to the unlock position to cause disengagement between the actuator and the stop surface and thereby allow rotation toward the release position.

2. The router attachment system of claim 1, wherein the lock comprises corresponding snaps on the attachment and mounting surfaces, the snaps snapping past each other during rotation from the release position to the attach position to hold the router attachment in the attach position.

3. The router attachment system of claim 1, wherein the actuator is movable along a transverse axis relative to the vertical axis, a spring supported by the attachment housing biasing the actuator toward the mounting adapter.

4. The router attachment system of claim 3, further comprising camming means between the mounting adapter and the actuator for automatically moving the actuator toward the unlock position against the bias of the spring in response to relative rotation between the mounting adapter and the router attachment toward the attach position.

5. The router attachment system of claim 3, wherein the actuator is mounted to a bottom side of the attachment housing and includes a pull tab projecting through an opposite top side of the attachment housing.

6. The router attachment system of claim 1, wherein the mounting adapter includes first flanges projecting radially along the annular mounting surface, and wherein the attachment housing includes second flanges projecting radially along the annular attachment surface, the first and second flanges being vertically movable past each other in the release position to permit vertical removal of the router attachment from the mounting adapter, the first and second flanges interlocking with each other when in the attach position to prevent vertical removal.

7. The router attachment system of claim 6, wherein the first flanges lie in a common plane substantially perpendicular to the vertical axis, and wherein the second flanges lie in a common plane substantially perpendicular to the vertical axis, and wherein the first flanges and second flanges are angularly spaced at equidistant angular intervals about the vertical axis.

8. The router attachment system of claim 6, further comprising first and second chamfered surfaces formed into the attachment and mounting surfaces, wherein vertical interference between the first and second chamfered surfaces provide for vertical retention in a first direction along the vertical axis, and wherein interlocking engagement between first and second flanges provides for vertical retention along the vertical axis in a second direction opposite said first direction.

9. The router attachment system of claim 1, wherein the router attachment comprises a generally circular collar portion defining the annular attachment surface, the collar portion centrally receiving the mounting adapter.

10. The router attachment system of claim 1, wherein the mounting adapter includes a generally circular collar portion defining the annular mounting surface, the collar portion centrally receiving the router attachment.

11. The router attachment system of claim 1, wherein the annular mounting surface of the mounting adapter includes an outer radial peripheral mounting surface adapted to mate with a first type of router attachment having collar portion for centrally receiving the mounting adapter, and a central hole adapted to communicate the spindle therethrough, the mounting adapter having an inner radial peripheral mounting surface about the central hole adapted to mate with a second type of router attachment that is received centrally into the central hole.

12. The router attachment system of claim 1, wherein the mounting adapter comprises a mounting plate having a plurality of bolt holes, and a central opening adapted to convey the spindle therethrough, further comprising bolts fastening the mounting plate to the router housing.

13. The router attachment system of claim 1, wherein the mounting adapter is integrally and unitarily formed with the router housing.

14. A router attachment system for a router, the router comprising a router housing and a spindle, the spindle revolving relative to the housing about a vertical axis, the router attachment system comprising:
 a mounting adapter plate having a plurality of bolt holes and a central hole adapted for communicating the spindle therethrough when the mounting adapter plate is mounted to the router housing, at least two of the bolt holes matching with corresponding bolt holes in the router housing, wherein the mounting adapter plate is adapted to be fastened to the router housing; and
 a router attachment attaching to and detaching from the mounting adapter plate without bolts, the router attachment vertically engaging and rotationally engaging the mounting adapter plate when attached to the mounting plate adapter to prevent relative movement therebetween;
 wherein the mounting adapter plate and the router attachment include corresponding annular mounting and attachment surfaces, respectively, the annular mounting and attachment surfaces adapted to mate with each other wherein the router attachment is rotatable between a release position and an attach position, the router attachment being removable from the mounting adapter plate in the release position, the router attachment vertically engaging the mounting adapter plate in opposing directions along the axis in the attach position for vertical retention of the router attachment; and
 further comprising an actuator carried by an attachment housing of the router attachment the actuator movable between a lock position and an unlock position, the mounting adapter plate including a stop surface engaging the actuator in the lock position to prevent relative rotation between the router attachment and the mounting adapter plate, the actuator being manually movable to the unlock position to cause disengagement between the actuator and the stop surface and thereby allow rotation to the release position.

15. The router attachment system of claim 14, further comprising:
 first vertical engagement means between the mounting adapter plate and the router attachment for vertically retaining the router attachment to the mounting adapter along a first direction along the vertical axis;
 second vertical engagement means between the mounting adapter plate and the router attachment for vertically retaining the router attachment to the mounting adapter along a second direction along the vertical axis opposite said first direction; and
 first rotational locking means for rotationally locking the router attachment to the mounting adapter plate in the attach position.

16. The router attachment of claim 14 wherein the mounting adapter plate includes an outer radial peripheral mounting surface adapted to mate with a first type of router attachment having collar portion for centrally receiving the mounting adapter plate, and wherein the mounting adapter includes an inner radial peripheral mounting surface defining a central hole that is adapted to mate with a second type of router attachment and that is received into the central hole.

17. The router attachment system of claim 14, further comprising corresponding snaps on the mounting and attachment surfaces, the snaps snapping past each other during rotation from the release position to the attach position to hold the router attachment in the attach position.

18. The router attachment system of claim 14, wherein the actuator is movable along a transverse axis relative to the vertical axis, a spring supported by the attachment housing biasing the actuator toward the mounting adapter.

19. The router attachment system of claim 14, wherein the mounting adapter plate includes first flanges projecting radially along the annular mounting surface, and wherein the router attachment includes second flanges projecting radially along the annular attachment surface, the first and second flanges being vertically movable past each other in the release position to permit removal of the router attachment from the mounting adapter plate, the first and second flanges interlocking with each other when in the attach position to prevent removal.

20. The router attachment system of claim 19, wherein the first flanges lie in a common plane substantially perpendicular to the vertical axis, and wherein the second flanges lie in a common plane substantially perpendicular to the vertical axis, and wherein the first flanges and second flanges are angularly spaced at equidistant angular intervals about the vertical axis.

21. The router attachment system of claim 19 further comprising first and chamfered conical surfaces between the mounting and attachment surfaces, respectively, wherein vertical interference between the first and second chamfered surfaces provide for vertical retention in a first direction along the vertical axis, and wherein interlocking engagement between first and second flanges provides for vertical retention along the vertical axis in a second direction opposite said first direction.

22. The router attachment system of claim 14, wherein the router attachment comprises a generally circular collar portion centrally receiving the mounting adapter plate.

23. The router attachment system of claim 14, wherein the router attachment is received into the central hole, the router attachment defining a central opening for communicating the spindle therethrough when mounted to the router.

24. A tool attachment for mounting to a mounting adapter along an axis, the mounting adapter including an annular mounting surface a plurality of mounting flanges angularly spaced about the axis, the tool attachment, comprising:
an attachment housing including a generally circular attachment surface sized and configured to mate with the annular mounting surface;
a plurality of attachment flanges projecting radially from the attachment housing along the attachment surface, the attachment flanges being arranged in a common plane generally perpendicular to the axis and angularly spaced about the axis, a plurality of gaps defined between adjacent pairs of the attachment flanges providing sufficient clearance to receive the mounting flanges through the gaps;
means for rotationally locking the attachment housing to the mounting adapter, and
wherein said locking means comprises an actuator carried by the attachment housing, the actuator movable between a lock position and an unlock position, the actuator being movable between the lock and Linlock positions transversely relative to the axis, the lock actuator including a stop tab projecting from the attachment surface in the lock position for engaging the mounting adapter.

25. The tool attachment system of claim 24, wherein said rotational locking means comprises at least one snap adapted to resiliently engage the mounting adapter.

26. The tool attachment of claim 25 wherein the at least one snap is formed into at least one of the attachment flanges.

27. The tool attachment of claim 26, wherein the at least one snap is formed into a bottom surface of at least one of the attachment flanges.

28. The tool attachment of claim 24, wherein the generally circular attachment surface comprises a chamfered engagement surface for vertically engaging the mounting adapter.

29. The tool attachment of claim 24, wherein the attachment housing comprises plastic material that form the attachment surface and the plurality of attachment flanges.

30. The tool attachment of claim 24, further comprising a spring supported by the attachment housing biasing the actuator toward the attachment surface.

31. The tool attachment of claim 30, further comprising camming means on the actuator for automatically moving the actuator toward the unlock position against the bias of the spring in response to relative rotation between the mounting adapter and the tool attachment toward the attach position.

32. The tool attachment of claim 24, wherein the actuator is mounted to a bottom side of the attachment housing and includes a pull tab projecting through an opposite top side of the attachment housing.

33. The tool attachment of claim 24, wherein the tool attachment comprises a generally circular collar portion defining the attachment surface, the collar portion adapted to centrally receive the mounting adapter.

34. The tool attachment of claim 24, wherein the attachment surface is formed into a radial periphery of the attachment housing with the attachment flanges projecting radially outward, the attachment housing adapted to be inserted into an opening in the mounting adapter.

35. The tool attachment of claim 24, further comprising guide means for engaging a working surface and for guiding movement of a spindle of a router when attached thereto.

36. The tool attachment of claim 35, wherein the guide means comprises an annular bushing projecting downward from a generally planar bottom slide surface.

37. The tool attachment of claim 35, wherein the guide means comprises a rail extending from the attachment housing and a slide selectively movable along the rail, the slide including a guide surface for engaging an edge of the working surface.

38. A method of releasably attaching a tool attachment to a mounting adapter about an axis, the method comprising:
installing the tool attachment onto a mounting adapter along the axis to facilitate engagement in a first direction along the axis between mounting and attachment surfaces of the mounting adapter and the tool attachment, respectively;
facilitating relative rotation about the axis between the mounting adapter and the tool attachment to cause interlocking engagement between corresponding flanges along the first and second attachment surfaces and thereby provide for retention of the tool attachment to the mounting adapter in a second direction opposition said first direction; and
rotationally locking the mounting adapter to the tool attachment; and
wherein said rotational locking comprises driving a spring loaded actuator transversely relative to the axis the actuator including a stop tab having an advanced position in which the stop tab is positioned to engage the mounting adapter to prevent relative rotation between the mounting adapter and the tool attachment.

39. The method of claim 38, wherein the mounting adapter is unitarily formed into a router housing of a router having a vertically rotatable spindle along the axis.

40. The method of claim 38, wherein the mounting adapter is provided by a mounting adapter plate, further comprising bolting the mounting adapter plate onto a router housing of a router having a vertically rotatable spindle along the axis, the spindle extending through the mounting adapter plate.

41. The method of claim 38, wherein said facilitating relative rotation comprising rotating at least one of the mounting adapter and the tool attachment about the axis until corresponding stop surfaces between the mounting adapter and the tool attachment abut.

42. The method of claim 38, wherein said rotational locking comprises resiliently snapping the tool attachment to the mounting adapter.

43. The method of claim 38, further comprising rotationally unlocking the mounting adapter from the tool attachment by manually retracting the stop tab and facilitating relative rotation about the axis between the mounting adapter and the tool attachment.

44. The method of claim 38, further comprising camming the actuator and thereby retracting the actuator automatically during said relative rotation.

45. The method of claim 38, wherein said installing comprises seating corresponding mating surfaces between the mounting adapter and the tool attachment in a first direction along the axis, passing a plurality of first flanges of the mounting adapter through corresponding gaps formed between a plurality of second flanges of the tool attachment, and said facilitating rotation comprises interlocking the first and second flanges to retain the tool attachment to the mounting adapter and prevent removal in a second direction opposite said first direction.

* * * * *

UNITED STATES PATENT AND TRADEMARK OFFICE
CERTIFICATE OF CORRECTION

| | | |
|---|---|---|
| PATENT NO. | : 7,089,978 B2 | Page 1 of 1 |
| APPLICATION NO. | : 10/777016 | |
| DATED | : August 15, 2006 | |
| INVENTOR(S) | : Joe Karkosch et al. | |

It is certified that error appears in the above-identified patent and that said Letters Patent is hereby corrected as shown below:

In Claim 14, Column 12, Line 3, delete the word "and" at the end of the sentence.

In Claim 38, Column 14, Line 53, delete the word "and" at the end of the sentence.

In Claim 38, Column 14, Line 57, insert a "," after the word "axis".

Signed and Sealed this

Fifth Day of December, 2006

JON W. DUDAS
*Director of the United States Patent and Trademark Office*